United States Patent
Lee et al.

(10) Patent No.: US 12,254,785 B2
(45) Date of Patent: Mar. 18, 2025

(54) DYNAMICALLY ADJUSTING INSTRUCTIONS IN AN AUGMENTED-REALITY EXPERIENCE

(71) Applicant: Google LLC, Mountain View, CA (US)

(72) Inventors: Jessica Lee, Brooklyn, NY (US); David Trotter Oleson, Ruschlikon (CH); Fabian Roth, Zurich (CH); Nils Grimsmo, Wollerau (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/969,303

(22) Filed: Oct. 19, 2022

(65) Prior Publication Data
US 2024/0135835 A1   Apr. 25, 2024
US 2024/0233569 A9   Jul. 11, 2024

(51) Int. Cl.
| | |
|---|---|
| G09B 7/04 | (2006.01) |
| G06F 3/04845 | (2022.01) |
| G06F 40/205 | (2020.01) |
| G06T 11/60 | (2006.01) |
| G06V 10/94 | (2022.01) |
| G06V 20/70 | (2022.01) |
| G06V 30/12 | (2022.01) |
| G06V 30/19 | (2022.01) |

(52) U.S. Cl.
CPC ........... *G09B 7/04* (2013.01); *G06F 3/04845* (2013.01); *G06F 40/205* (2020.01); *G06T 11/60* (2013.01); *G06V 10/945* (2022.01); *G06V 20/70* (2022.01); *G06V 30/127* (2022.01); *G06V 30/19133* (2022.01); *G06V 30/19147* (2022.01)

(58) Field of Classification Search
CPC ..... G09B 7/04; G06F 3/04845; G06F 40/205; G06T 11/60; G06V 10/945; G06V 20/70; G06V 30/127; G06V 30/19133; G06V 30/19147
See application file for complete search history.

(56) References Cited

U.S. PATENT DOCUMENTS

| | | | |
|---|---|---|---|
| 9,792,732 B2 | 10/2017 | Palm et al. | |
| 10,971,026 B1* | 4/2021 | Norkaitis | ................. G09B 7/08 |
| 11,386,624 B2 | 7/2022 | Su et al. | |
| 2004/0072136 A1* | 4/2004 | Roschelle | ................ G09B 7/00 |
| | | | 434/350 |
| 2005/0288078 A1 | 12/2005 | Cheok | |

(Continued)

OTHER PUBLICATIONS

Cooper et al, "Augmented Reality Chinese Checkers", School of Computer and Information Science, University of South Australia, 2004, 10 pages.

(Continued)

*Primary Examiner* — Jack Yip
(74) *Attorney, Agent, or Firm* — DORITY & MANNING P.A.

(57) ABSTRACT

Systems and methods for augmented-reality tutoring can utilize optical character recognition, natural language processing, and/or augmented-reality rendering for providing real-time notifications for completing a determined task. The systems and methods can include utilizing one or more machine-learned models trained for quantitative reasoning and can include providing a plurality of different user interface elements at different times.

20 Claims, 15 Drawing Sheets

(56) References Cited

U.S. PATENT DOCUMENTS

| | | | |
|---|---|---|---|
| 2007/0201863 A1 | 8/2007 | Wilson et al. | |
| 2008/0222065 A1 | 9/2008 | Kedrowski et al. | |
| 2009/0005142 A1 | 1/2009 | Yang | |
| 2009/0142742 A1* | 6/2009 | Goldberg | G09B 7/02 |
| | | | 434/362 |
| 2014/0120516 A1* | 5/2014 | Chiang | G09B 5/02 |
| | | | 434/362 |
| 2015/0104778 A1* | 4/2015 | Liu | G09B 5/08 |
| | | | 434/335 |
| 2018/0181855 A1* | 6/2018 | Johnson, Jr. | G06F 16/9032 |
| 2019/0050639 A1 | 2/2019 | Ast | |
| 2019/0272775 A1* | 9/2019 | Noble | G09B 5/12 |
| 2020/0364448 A1* | 11/2020 | Goble | G06F 3/0304 |
| 2021/0383711 A1* | 12/2021 | Panuganty | G06F 40/143 |
| 2022/0068153 A1 | 3/2022 | Harlow et al. | |
| 2022/0122327 A1 | 4/2022 | Bilgory et al. | |
| 2022/0122484 A1* | 4/2022 | Chuang | G09B 19/025 |
| 2023/0020145 A1* | 1/2023 | Kang | G09B 7/04 |

OTHER PUBLICATIONS

Byrod, "An Optical Sudoku Solver", http://www.maths.lth.se/matematiklth/personal/byrod/papers/sudok.uocr.pdf., Feb. 12, 2007, 9 pages.

Cakmakci, "An Augmented Reality Based Learning Assistant for Electric Bass Guitar", International Conference on Human-Computer Interaction, Jun. 22-27, 2003, Crete, Greece, 2 pages.

Universitat Politecnica de Catalunya, "Two Students from the Terrassa School of Engineering Design an Innovative Augmented Reality System for Learning to Play Chess", http:/www.alphagalileo.org/Viewitem.aspx?ItemID=96464&/CultureCode=en, Feb. 18, 2011.

Wilson, "Play Anywhere: A compact Interactive Tabletop Projection-vision system", Symposium on User Interface Software and Technology, Oct. 23-26, 2005, Seattle, Washington, pp. 83-92.

Cakmakci, "An Augmented Reality Based Learning Assistant for Electric Bass Guitar", 10th International Conference on Human-Computer Interaction, Jun. 22-27, 2003, Crete, Greece, 2 pages.

Universitat Politecnica de Catalunya, "Two Students from the Terrassa School of Engineering Design an Innovative Augmented Reality System for Learning to Play Chess", http://'1A1YV\v.a112bagalileo.org/ViewTtem.asDx?IternlD=96464&/CultureCode=en, Feb. 18, 2011, Retrieved on Nov. 10, 2022, 1 page.

Wilson, "Play Anywhere: A Compact Interactive Tabletop Projection-Vision System", Symposium on User Interface Software and Technology, Oct. 23-26, 2005, Seattle, Washington, United States, pp. 83-92.

International Search Report and Written Opinion for Application No. PCT/US2023/031343, mailed Dec. 5, 2023, 14 pages.

Lewkowyez et al., "Solving Quantitative Reasoning Problems with Language Models", arXiv:2206.14858v2, dated Jul. 1, 2022, 54 pages.

* cited by examiner

Please Try To Do All 8 Problems Except
Equally. No Notes Or Books Allowed. Good Luck!
Hand It In With Your Exam. Good Luck!

Problem 1. Assume that $S,T$
$(ST)^2 = 0$.

Problem 2. Assume $V$ is fin
invertible and $T^{-1} = US$.

Problem 3. Assume
Prove th are operators such that range$(S)$

Show if $STU = \mathbb{I} \Rightarrow T$ is invertible.

① If $U$ is injective $\Rightarrow U$ is invertible.
 If $Ux = \theta$
 $\underline{x} = I\underline{x} = (STU)\underline{x} = ST(U\underline{x}) = ST\theta = \theta$
 $\underline{x} = \underline{\theta}$
 HENCE $U$ is injective $\Rightarrow U$ is invertible.

② If $S$ us surjective $\Rightarrow S$ is invertible.
 For only $\underline{y}$ in $V$, there exams $\underline{x} \in V$ such that $s\underline{x} = \underline{y}$
 $\underline{y} = I\underline{y} = (STU)(\underline{y}) = S(TU)(\underline{y})$
 $\underline{x} = I\underline{x} = (TU)(\underline{y}) \Rightarrow S\underline{x} = \underline{y}$
 HENCE $S$ is subjective $\Rightarrow S$ is invertible.

③ $T$ is invertible.
 $T = S^{-1} STU\, U^{-1} = S^{-1} X\, U^{-1} = S^{-1}\, U^{-1}$
 $S$ and $T$ are invertible, hence $T = S^{-1}\, U^{-1}$ is invertible
 and $\underline{\underline{T^{-1}}} = (S^{-1}\, U^{-1})^{-1} = (U^{-1})^{-1}\, (S^{-1})^{-1} = \underline{\underline{US}}$

— 222

SOLVED
GOOD JOB! YOU SOLVED IT!

— 224

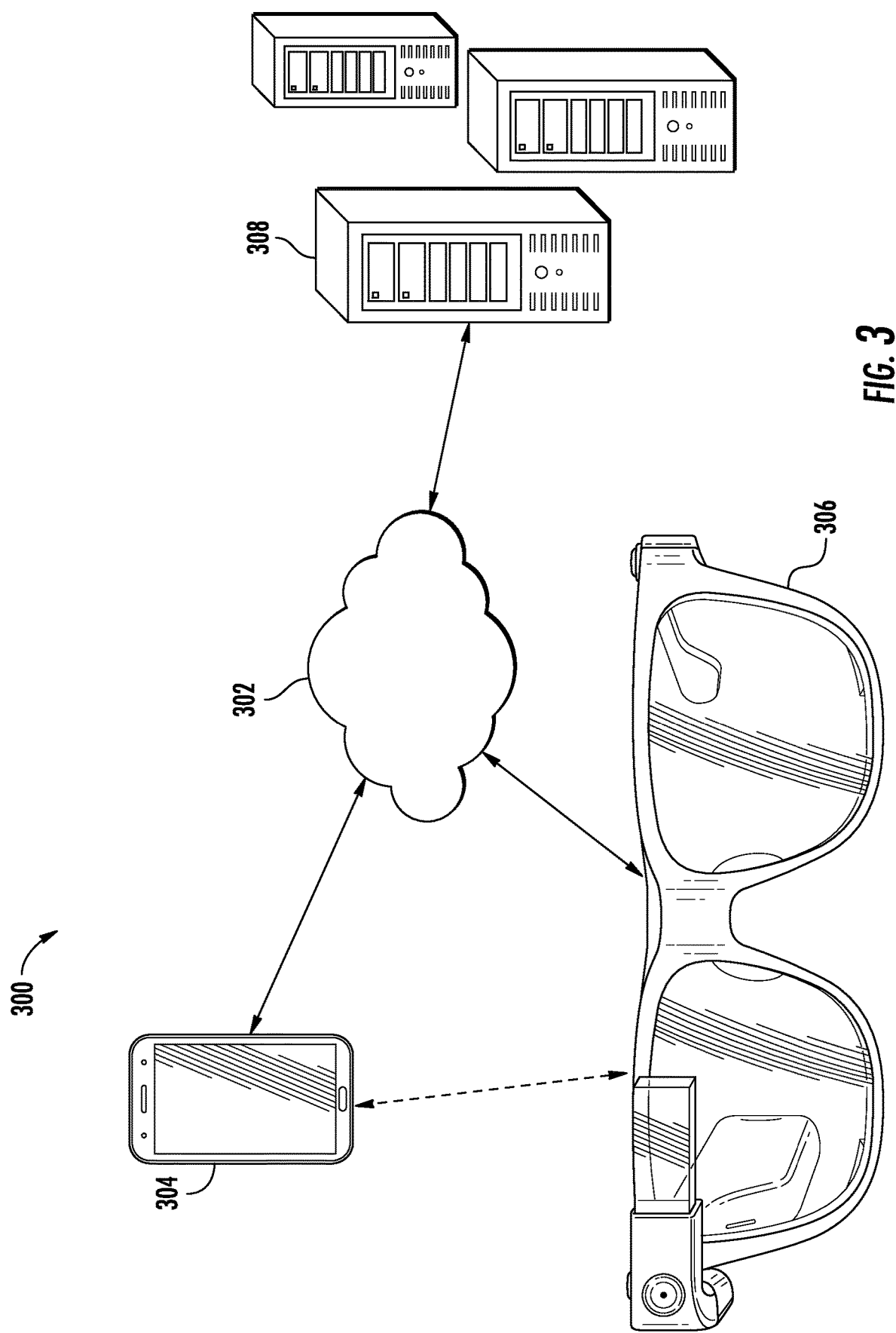

DYNAMICALLY ADJUSTING INSTRUCTIONS IN AN AUGMENTED-REALITY EXPERIENCE

FIELD

The present disclosure relates generally to error detection and corrective action conveyance via an augmented-reality experience. More particularly, the present disclosure relates to obtaining image data, processing the image data to determine an error is present in the image data, determining a corrective action, and providing one or more user interface elements for display to indicate a corrective action.

BACKGROUND

Determining errors in an environment and figuring out how to correct the determined errors can be difficult. In particular, errors in text may be difficult to detect. Additionally, if errors go undetected, the error can lead to a propagation of further errors, which lead to further confusion. The lack of real-time error detection can lead to a user spending time on a problem without understanding when and where they went wrong.

Additionally, some errors and/or problems may include a difficult and intricate response in order to resolve the problem or error. Such difficult and intricate responses may be prone to user confusion; therefore, further errors may be generated when attempting to resolve the errors.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining image data. The image data can be descriptive of one or more images. In some implementations, the one or more images can be descriptive of an environment. The operations can include processing the image data to generate semantic data. The semantic data can be descriptive of a semantic understanding of at least a portion of the one or more images. The operations can include determining an error in the one or more images based at least in part on the semantic data. The operations can include determining a corrective action based on the semantic data and the error. In some implementations, the corrective action can be descriptive of at least one of a replacement for the error or an action to fix the error. The operations can include providing a user interface element for display based on the corrective action. The user interface element can include informational data descriptive of the corrective action.

In some implementations, determining the error in the one or more images based at least in part on the semantic data can include obtaining a particular machine-learned model based on the semantic data and processing the image data with the particular machine-learned model to detect the error. The error can include an inconsistency with the semantic understanding. In some implementations, the error can include a deviation from a multi-part process. The multi-part process can be associated with the semantic data. In some implementations, determining the corrective action based on the semantic data and the error can include detecting a position of the error within the environment, determining an errorless dataset associated with the semantic data and the one or more images, and determining replacement data from the errorless dataset based on the position of the error within the environment.

In some implementations, the error can be determined with an error detection model. The error detection model can generate text data based on optical character recognition, can parse the text data based on one or more features in the environment, and can process each parsed segment of a plurality of parsed segments to determine the error. In some implementations, the error detection model can be trained on a plurality of mathematical proofs. The error detection model can include an optical character recognition model and a natural language processing model.

In some implementations, the image data can be generated by one or more image sensors of a mobile computing device. The user interface element can be provided for display via the mobile computing device. The mobile computing device can be a smart wearable.

Another example aspect of the present disclosure is directed to a computer-implemented method. The method can include obtaining, by a computing system including one or more processors, image data. The image data can be descriptive of one or more images. In some implementations, the one or more images can be descriptive of one or more pages. The method can include processing, by the computing system, the image data with an optical character recognition model to generate text data. In some implementations, the text data can be descriptive of text on the one or more pages. The method can include determining, by the computing system, a prompt based on the text data. The prompt can be descriptive of a request for a response. The method can include determining, by the computing system, a multi-part response to the prompt. The multi-part response can include a plurality of individual responses associated with the prompt. The method can include obtaining, by the computing system, additional image data. The additional image data can be descriptive of one or more additional images. In some implementations, the one or more additional images can be descriptive of the one or more pages with user-generated text. The method can include processing, by the computing system, the additional image data with the optical character recognition model to generate additional text data. The additional text data can be descriptive of the user-generated text on the one or more pages. The method can include determining, by the computing system, the user-generated text deviates from the multi-part response and providing, by the computing system, a notification. The notification can be descriptive of the user-generated text having an error.

In some implementations, determining, by the computing system, the user-generated text deviates from the multi-part response can include determining the user-generated text contradicts the multi-part response. Determining, by the computing system, the user-generated text deviates from the multi-part response can include determining the user-generated text lacks one or more particular features of the multi-part response. In some implementations, the one or more pages can include one or more questions. The user-generated text can include a user response to the one or more questions. The method can include processing, by the computing system, the image data with a machine-learned model to determine the prompt and the multi-part response. In some implementations, the method can include processing, by the computing system, the additional image data with a machine-learned model to determine the user-generated text deviates from the multi-part response.

Another example aspect of the present disclosure is directed to one or more non-transitory computer-readable media that collectively store instructions that, when executed by one or more computing devices, cause the one or more computing devices to perform operations. The operations can include obtaining image data. The image data can be descriptive of one or more images. In some implementations, the one or more images can be descriptive of one or more pages. The one or more pages can include a plurality of characters. The operations can include processing the image data to generate semantic data. The semantic data can be descriptive of a semantic understanding of at least a portion of the plurality of characters. The operations can include determining the plurality of characters comprise an error based at least in part on the semantic data. The error can be descriptive of text that is at least one of counter to the semantic understanding or an inaccuracy. The operations can include determining a corrective action based on the semantic data and the error. In some implementations, the corrective action can be descriptive of at least one of a replacement for the error or an action to fix the error. The operations can include providing a user interface element for display based on the corrective action. The user interface element can include informational data descriptive of the corrective action.

In some implementations, the user interface element can include one or more pop-up elements that are descriptive of a plurality of sub-actions for performing the corrective action. The user interface element can include an in-line overlay. The in-line overlay can be utilized to augment at least one of the one or more images or one or more additional images to generate one or more augmented images. In some implementations, the one or more augmented images can include the in-line overlay superimposed over at least a portion of the one or more pages. The in-line overlay can be descriptive of the corrective action. In some implementations, the user interface element can include augmenting one or more of the images to indicate a position of the error.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 2A-2E depict illustrations of an example augmented-reality experience according to example embodiments of the present disclosure.

FIG. 3 depicts a block diagram of an example computing system that performs augmented-reality tutoring according to example embodiments of the present disclosure.

Figure 1A:
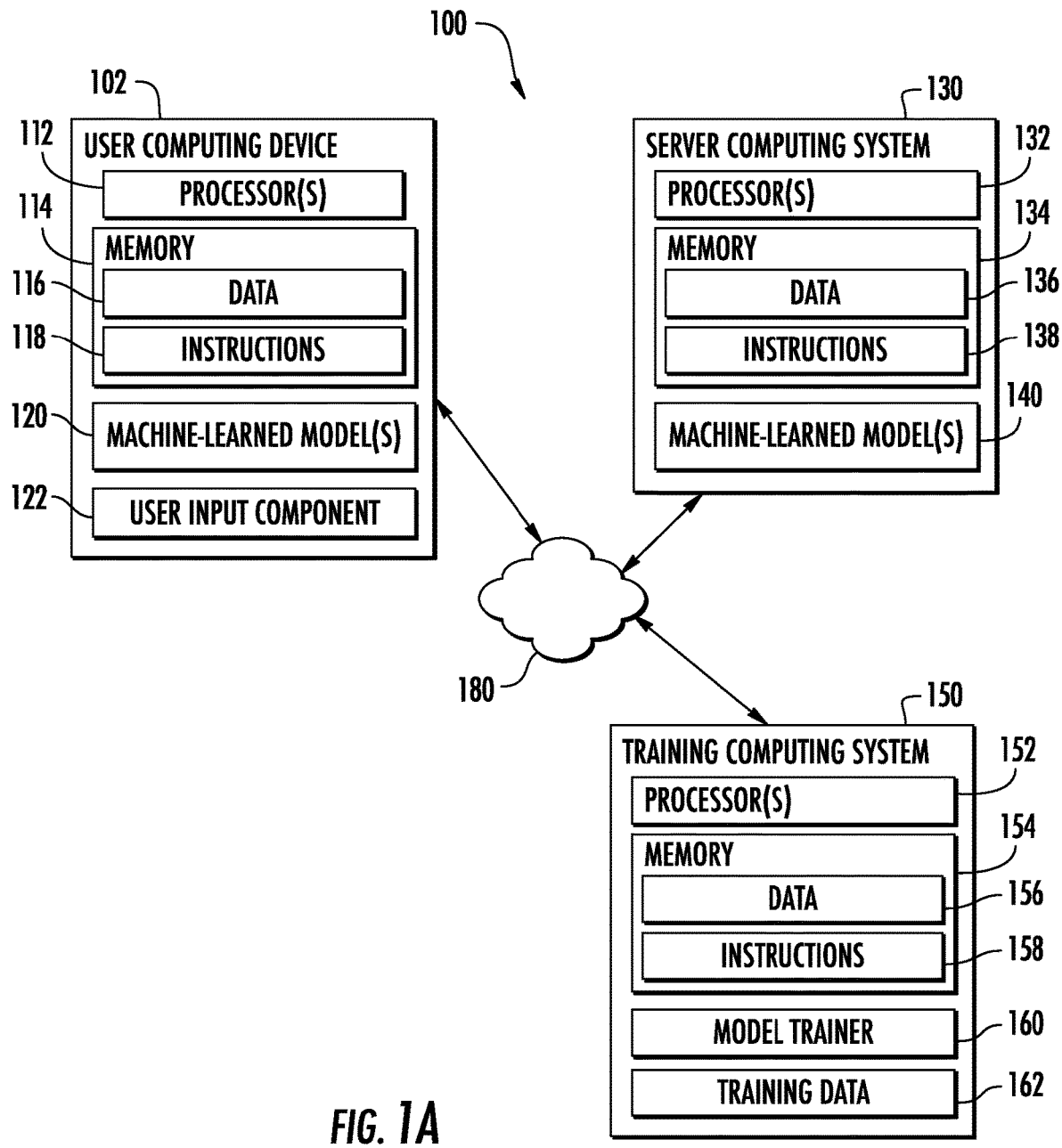
FIG. 1A depicts a block diagram of an example computing system that performs augmented-reality tutoring according to example embodiments of the present disclosure.

Reference numerals that are repeated across plural figures are intended to identify the same features in various implementations.

DETAILED DESCRIPTION

Overview

Generally, the present disclosure is directed to an augmented-reality experience that provides a plurality of augmented-reality assets based on processed image data. In particular, the systems and methods disclosed herein can leverage image processing (e.g., optical character recognition and/or object recognition), semantic understanding, and/or one or more user interface elements (e.g., in-line overlay, pop-up bubbles, and/or highlighting) to provide real-time instructions for correcting mistakes and/or solving problems. In some implementations, the systems and methods can be utilized for augmented-reality tutoring, for do-it-yourself projects, and/or for error detection and correction.

For example, the systems and methods can include obtaining image data. The image data can be descriptive of one or more images. In some implementations, the one or more images can be descriptive of an environment. The systems and methods can include processing the image data to generate semantic data. The semantic data can be descriptive of a semantic understanding of at least a portion of the one or more images. The systems and methods can include determining an error in the one or more images based at least in part on the semantic data. In some implementations, the systems and methods can include determining a corrective action based on the semantic data and the error. The corrective action can be descriptive of at least one of a replacement for the error or an action to fix the error. The systems and methods can include providing a user interface element for display based on the corrective action. The user interface element can include informational data descriptive of the corrective action.

Image data can be obtained. The image data can be descriptive of one or more images. In some implementations, the one or more images can be descriptive of an environment. The environment can include one or more problems. For example, the environment can include questions for a user to answer. Alternatively and/or additionally, the environment can include objects for completing a do-it-yourself project. The image data can be generated by one or more image sensors of a mobile computing device (e.g., a smart phone). In some implementations, the mobile computing device can be a smart wearable (e.g., smart glasses).

The image data can be processed to generate semantic data. The semantic data can be descriptive of a semantic understanding of at least a portion of the one or more images. In some implementations, the image data can be processed with a semantic understanding model. The semantic understanding model can include one or more machine-learned models. The semantic understanding model can include a natural language processing model (e.g., one or more large language models training on a plurality of examples). In some implementations, the semantic understanding model can include a machine-learned model trained to understand equations and/or other quantitative representations (e.g., a language model trained for quantitative reasoning as discussed in Dyer et al., *Minerva: Solving Quantitative Reasoning Problems with Language Models*, GOOGLE AI BLOG (Jun. 30, 2022), https://ai.googleblog.com/2022/06/minerva-solving-quantitative-reason). Additionally and/or alternatively, the image data may be processed with an optical character recognition model to generate text data, which can then be processed with the semantic understanding model. The semantic data can be based on the contents of text, recognized objects, the structure of the data, the layout of data, the structure of the information, one or more diagrams, received additional input data, context of the image capture, the type of image capture device, user profile data, and/or one or more other contexts. The semantic data can include one or more queries that summarize a problem (e.g., a question) in a focal point of the one or more images.

The systems and methods can determine an error in the one or more images based at least in part on the semantic data. The error can include an inconsistency with the semantic understanding. In some implementations, the error can include a deviation from a multi-part process. The multi-part process can be associated with the semantic data. For example, the multi-part process can include one or more actions for responding to a question and/or solving a problem. The error can be determined based on heuristics, based on obtained data, and/or based on an output of a machine-learned model. The error may be determined based on the handwriting text differing from the semantic intent of the printed text. For example, the semantic data can include a semantic intent of the printed text and a semantic understanding of the handwritten text. If the semantic understanding of the handwritten text is not associated with the semantic intent of the printed text, an error may be determined.

In some implementations, determining the error in the one or more images based at least in part on the semantic data can include obtaining a particular machine-learned model based on the semantic data and processing the image data with the particular machine-learned model to detect the error. For example, the semantic data may be descriptive of a particular problem type (e.g., a literary analysis problem type, a calculus problem, and/or an organic chemistry problem) and a problem-specific machine-learned model (e.g., a literary analysis model, a calculus model, and/or an organic chemistry model). Alternatively and/or additionally, a math engine (e.g., a system of mathematical functions utilized to process a problem utilizing one or more processors) may be obtained and utilized based on the semantic data.

Alternatively and/or additionally, determining the corrective action based on the semantic data and the error can include detecting a position of the error within the environment, determining an errorless dataset associated with the semantic data and the one or more images, and determining replacement data from the errorless dataset based on the position of the error within the environment.

In some implementations, the error can be determined with an error detection model. The error detection model can generate text data based on optical character recognition. The error detection model can parse the text data based on one or more features in the environment. In some implementations, the error detection model can process each parsed segment of the plurality of parsed segments to determine the error. The error detection model can be trained on a plurality of mathematical proofs. Additionally and/or alternatively, the error detection model can include an optical character recognition model and a natural language processing model.

A corrective action can be determined based on the semantic data and the error. The corrective action can be descriptive of at least one of a replacement for the error or an action to fix the error. In some implementations, the corrective action can include indicating the position of the error in the environment and one or more actions for correctly responding to a prompt identified in the environment.

The systems and methods can provide a user interface element for display based on the corrective action. The user interface element can include informational data descriptive of the corrective action. In some implementations, the user interface element can be provided for display via the mobile computing device. The user interface element can be provided via an augmented-reality experience. The user interface element can include highlighting the prompt, in-line comments, a pop-up bubble, and/or one or more arrows.

Additionally and/or alternatively, the systems and methods can continually process image data to determine and correct actions of the user in real-time via one or more user-interface elements being provided in response to the determined error. For example, the systems and methods can include obtaining image data. The image data can be descriptive of one or more images. In some implementations, the one or more images can be descriptive of one or more pages. The image data can be processed with an optical character recognition model to generate text data. The text data can be descriptive of text on the one or more pages. The systems and methods can include determining a prompt based on the text data. The prompt can be descriptive of a request for a response. The systems and methods can include determining a multi-part response to the prompt. The multi-part response can include a plurality of individual responses associated with the prompt. In some implementations, the systems and methods can include obtaining additional image data. The additional image data can be descriptive of one or more additional images. The one or more additional images can be descriptive of the one or more pages with user-generated text (e.g., additional handwritten text and/or user-typed data (e.g., user-generated code and/or user-generated equations)). The additional image data can be processed with the optical character recognition model to generate additional text data. In some implementations, the additional text data can be descriptive of the user-generated text on the one or more pages. The systems and methods can include determining the user-generated text deviates from the multi-part response and providing a notification. The notification can be descriptive of the user-generated text having an error.

The systems and methods can obtain image data, wherein the image data is descriptive of one or more images. The one or more images can be descriptive of one or more pages. In some implementations, the one or more pages can include one or more questions. The one or more ages can include printed text and handwritten text. The one or more questions can include a mathematical equation, a writing prompt, and/or a science question including one or more diagrams.

The image data can be processed with an optical character recognition model to generate text data. The text data can be descriptive of text on the one or more pages. The optical character recognition model can include one or more machine-learned models. The optical character recognition model can include a model specifically trained on handwritten text. The text data can include recognized printed text and/or recognized handwritten text.

The systems and methods can determine a prompt based on the text data. The prompt can be descriptive of a request for a response. The prompt can be determined based on a semantic understanding of the text on the one or more pages. Alternatively and/or additionally, the prompt can be a query generated based on the recognized text. The prompt may be determined based on the text including one or more keywords associated with one or more prompts and/or one or more prompt types.

The systems and methods can determine a multi-part response to the prompt. The multi-part response can include a plurality of individual responses associated with the prompt. The multi-part response may be determined based on an output of a machine-learned model, based on heuristics, based on one or more search results received from a search engine, and/or one or more knowledge graphs. The multi-part response may be based on an output of a machine-learned model trained on one or more textbooks. For example, a machine-learned model may be trained to identify particular types of problems based on one or more identified features, and the same or a separate model may be trained to generate a proof illustrating how to solve the particular problem. The generated proof may be the multi-part response in which each line of the proof is a part of the response.

Additional image data can be obtained. The additional image data can be descriptive of one or more additional images. The one or more additional images can be descriptive of the one or more pages with user-generated text (e.g., additional handwritten text and/or user-typed data (e.g., user-generated code and/or user-generated equations)). The user-generated text can include a user response to the one or more questions.

The additional image data can be processed with the optical character recognition model to generate additional text data. The additional text data can be descriptive of the user-generated text on the one or more pages and/or on a computer screen. The user-generated text may be descriptive of a user's attempt at answering a prompt (e.g., answering a question).

The user-generated text can be determined to deviate from the multi-part response. The deviation can be a deviation from the multipart response such that the user-generated text is counter to the multi-part response. For example, the multi-part response may include taking a first action then a second action, and the user-generated text may include taking a first action then a third action not equivalent to the second action.

In some implementations, determining the user-generated text deviates from the multi-part response can include determining the user-generated text contradicts the multi-part response. For example, the user-generated text includes a semantic intent that contradicts the semantic intent of one or more parts of the multi-part response.

Alternatively and/or additionally, determining the user-generated text deviates from the multi-part response can include determining the user-generated text lacks one or more particular features of the multi-part response. For example, the multi-part response may include multiplying both sides of an equation by 2×, while the user-generated text only multiplies one side by 2×.

The systems and methods can provide a notification. The notification can be descriptive of the user-generated text having an error. The notification can be provided via an augmented-reality experience that renders one or more user interface elements to provide the notification. The notification may be descriptive of where the error occurred and how to resolve the error.

In some implementations, the systems and methods can process the image data with a machine-learned model to determine the prompt and the multi-part response. The machine-learned model may be a language model trained on quantitative reasoning. In some implementations, the machine-learned model may be specifically trained on one or more subjects using scholastic materials (e.g., textbooks and/or scholarly articles).

In some implementations, the systems and methods can process the additional image data with a machine-learned model to determine the user-generated text deviates from the multi-part response.

The systems and methods can include obtaining image data. The image data can be descriptive of one or more images. In some implementations, the one or more images can be descriptive of one or more pages. The one or more pages can include a plurality of characters. The image data can be processed to generate semantic data. The semantic data can be descriptive of a semantic understanding of at least a portion of the plurality of characters. The systems and methods can include determining the plurality of characters comprise an error based at least in part on the semantic data. An error can be descriptive of text that is at least one of counter to the semantic understanding or an inaccuracy. In some implementations, the systems and methods can include determining a corrective action based on the semantic data and the error. The corrective action can be descriptive of at least one of a replacement for the error or an action to fix the error. The systems and methods can include providing a user interface element for display based on the corrective action. The user interface element can include informational data descriptive of the corrective action.

The systems and methods can obtain image data. The image data can be descriptive of one or more images. The one or more images can be descriptive of one or more pages. In some implementations, the one or more pages can include a plurality of characters. The plurality of characters can be part of a problem (e.g., a question, a writing prompt, and/or an issue statement). The characters can include letters, numbers, and/or symbols. The one or more pages can include text, pictures, shapes, diagrams, and/or white space.

The image data can be processed to generate semantic data. The semantic data can be descriptive of a semantic understanding of at least a portion of the plurality of characters. In some implementations, the semantic data may be based on text, pictures, shapes, diagrams, and/or white space.

The systems and methods can determine the plurality of characters include an error based at least in part on the semantic data. The error can be descriptive of text that is at least one of counter to the semantic understanding or an inaccuracy. The inaccuracy can be determined by processing the plurality of characters with one or more machine-learned models.

The systems and methods can determine a corrective action based on the semantic data and the error. The corrective action can be descriptive of at least one of a replacement for the error or an action to fix the error. The corrective action may include a deletion action (e.g., deleting a subset of the plurality of characters) and a writing action (e.g., writing down one or more new characters).

The systems and methods can provide a user interface element for display based on the corrective action. The user interface element can include informational data descriptive of the corrective action. In some implementations, the user interface element can include one or more pop-up elements that are descriptive of a plurality of sub-actions for performing the corrective action. The user interface element may include an in-line overlay. The in-line overlay can be utilized to augment at least one of the one or more images or one or more additional images to generate one or more augmented images. The one or more augmented images can include the in-line overlay superimposed over at least a portion of the one or more pages. In some implementations, the in-line overlay can be descriptive of the corrective action. Additionally and/or alternatively, the user interface element can include augmenting one or more of the images to indicate a position of the error.

In some implementations, the systems and methods can include continuous intake of image data, continuous image data processing, continuous diagnosis of errors, and/or continuous generation of user interface elements for correcting errors. For example, the systems and methods can utilize streaming optical character recognition. The user interface elements (e.g., the user interface elements for the notifications) can be provided in a conversational manner such that the multi-part response can be provided in stages as a user progresses through different portions of the problem solving.

In some implementations, one or more machine-learned models may be trained on one or more textbooks, real-world flash cards (e.g., flashcards for a foreign language or for scientific names for structures, elements, or compounds), architectural drawings, knowledge graphs, and/or study guides. Additionally and/or alternatively, the one or more machine-learned models may be trained on proofs. Training may include training to conform to a rules engine output. Alternatively and/or additionally, the training can include blackbox optimization. The systems and methods can be utilized for writing tasks, language learning tasks, mathematical problem solving tasks (e.g., algebra, calculus, and/or discrete math), science problem solving tasks (e.g., physics, organic chemistry, biology, and/or chemistry), architecture designing (e.g., tracing lines and following measurements), and/or surgical procedures. The systems and methods may determine the prompt includes a plurality of requested criteria, and the user's response can be processed to determine which criteria has been met and which criteria has not been met.

The systems and methods disclosed herein may be initiated based on one or more inputs (e.g., a voice command, a button selection, and/or a visual queue).

In some implementations, the systems and methods can include parsing the one or more images and/or parsing the text data generated via optical character recognition. The parsing can be based on lines, paragraphs, syntax, page structure, image regions, and/or one or more other features.

In some implementations, one or more teachers may be provided with a software development kit to tailor the augmented-reality tutor for their particular class, course curriculum, and/or teaching style.

The systems and methods of the present disclosure provide a number of technical effects and benefits. As one example, the system and methods can provide an augmented-reality tutor experience. In particular, the systems and methods disclosed herein can leverage optical character recognition, natural language processing, and augmented-reality rendering to provide an interactive experience for identifying errors and providing multi-part responses.

Another technical benefit of the systems and methods of the present disclosure is the ability to leverage one or more machine-learned models to understand an environment and provide a step by step process for completing a task. For example, the systems and methods can determine the semantics of an environment, can determine a prompt associated with the environment, can determine a multi-part response associated with the prompt, and can continually collect data to ensure a user completes actions associated with the multi-part response.

Another example of technical effect and benefit relates to improved computational efficiency and improvements in the functioning of a computing system. For example, the systems and methods disclosed herein can leverage the storage of the determined prompt and multi-part response to continually compare the additionally obtained data against the multi-part response without having to continually redetermine the semantics of the environment for error detection.

With reference now to the Figures, example embodiments of the present disclosure will be discussed in further detail.

Example Devices and Systems

FIG. 1A depicts a block diagram of an example computing system 100 that performs dynamically adjusting instructions in an augmented-reality experience according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more semantic understanding models 120. For example, the semantic understanding models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example semantic understanding models 120 are discussed with reference to FIGS. 2A-5.

In some implementations, the one or more semantic understanding models 120 can be received from the server computing system 130 over network 180, stored in the user computing device memory 114, and then used or otherwise implemented by the one or more processors 112. In some implementations, the user computing device 102 can implement multiple parallel instances of a single semantic understanding model 120 (e.g., to perform parallel image data processing across multiple instances of images of an environment).

More particularly, the systems and methods can utilize one or more machine-learned models, which can include one or more semantic understanding models 120 that can process image data, text data, and/or audio data to generate semantic data associated with an environment. The semantic data can be utilized to detect an error in an environment and generate a corrective action for remedying the error.

Additionally or alternatively, one or more semantic understanding models 140 can be included in or otherwise stored and implemented by the server computing system 130 that communicates with the user computing device 102 according to a client-server relationship. For example, the semantic understanding models 140 can be implemented by the server computing system 140 as a portion of a web service (e.g., a tutoring service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned semantic understanding models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2A-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the semantic understanding models 120 and/or 140 based on a set of training data 162. The training data 162 can include, for example, textbooks, flash cards, scholarly articles, equations, natural language, books, proofs, and/or homework keys.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
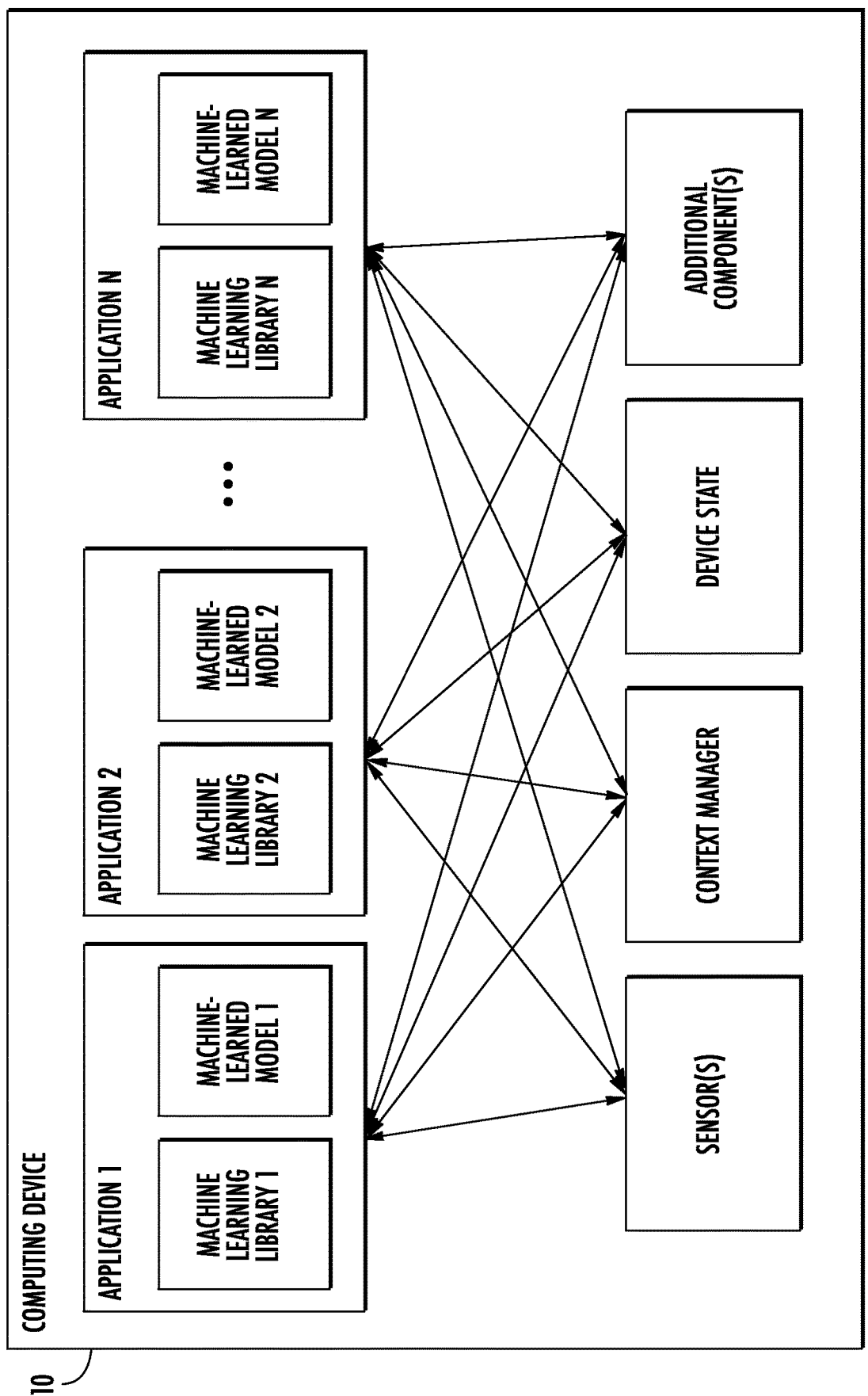
FIG. 1B depicts a block diagram of an example computing device that performs augmented-reality tutoring according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
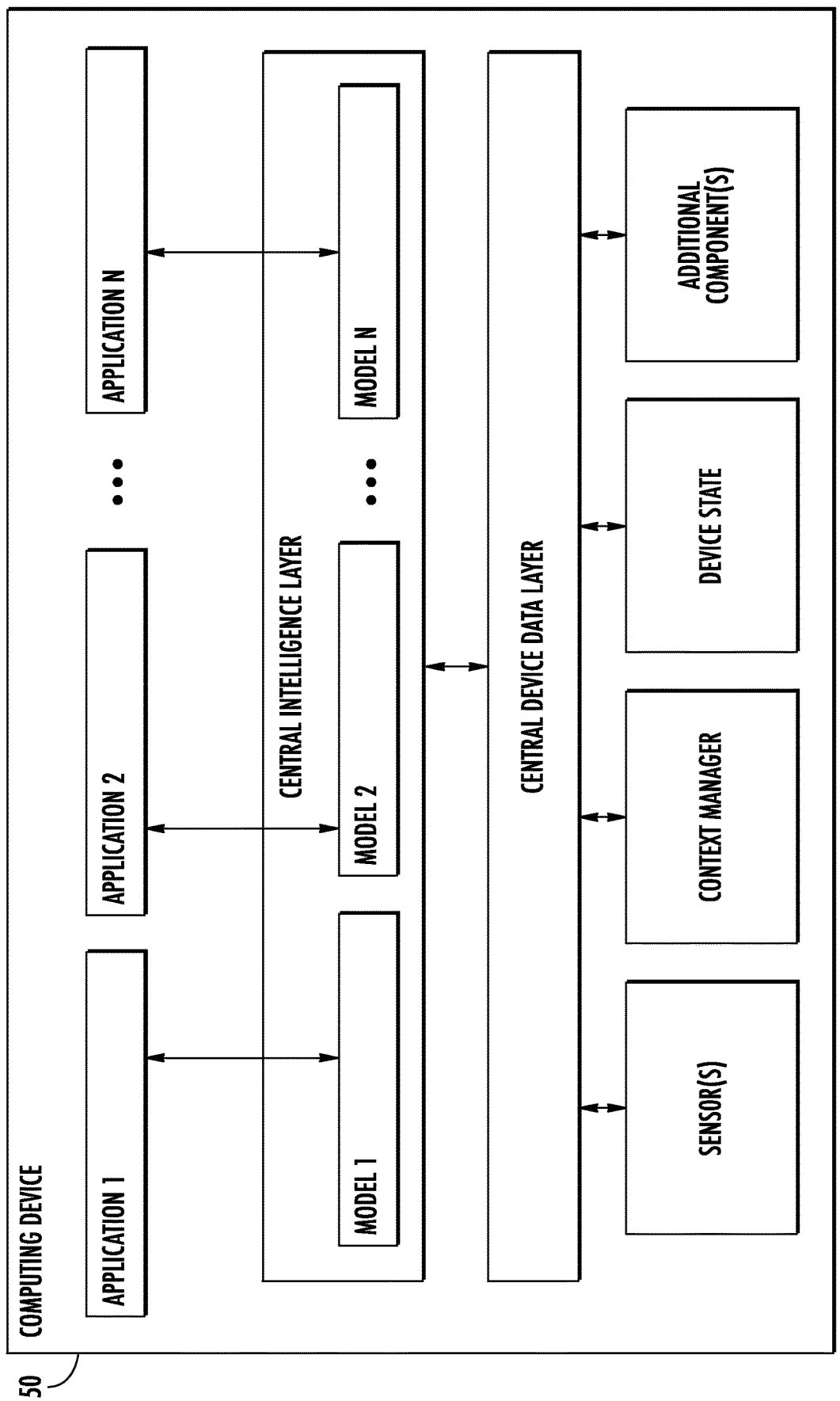
FIG. 1C depicts a block diagram of an example computing device that performs augmented-reality tutoring according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

FIG. 3 depicts a block diagram of an example computing system 300 that performs augmented-reality tutoring according to example embodiments of the present disclosure. For example, the systems and methods disclosed herein can include one or more computing devices communicatively connected via a network 302. In some implementations, the computing system 300 can include one or more image sensors, one or more visual displays, one or more audio sensors, one or more audio output components, one or more storage devices, and/or one or more processors. The computing system 300 can include a smart device 304 (e.g., a smart phone) and/or a smart wearable 306 (e.g., smart glasses). In some implementations, a smart device 304 and a smart wearable 306 can be communicatively connected via the network 302, a Bluetooth connection, and/or via another communication medium. For example, the display, the sensors, and/or the processors of the smart device 304 may be utilized with the smart wearable 306. In some implementations, the smart device 304 and/or the smart wearable 306 may exchange data with one or more server computing systems 308 to perform the systems and methods disclosed herein.

Example System Arrangements and Example Model Arrangements

FIGS. 2A-2E depict illustrations of an example augmented-reality experience according to example embodiments of the present disclosure. The example augmented-reality experience can be initiated based on one or more inputs (e.g., a button compression, a touch input to a touch screen, object detection or classification, and/or an audio input). In response to the augmented-reality experience being initiated, one or more images 202 can be obtained. In some implementations, audio input can be obtained.

Figure 2A:
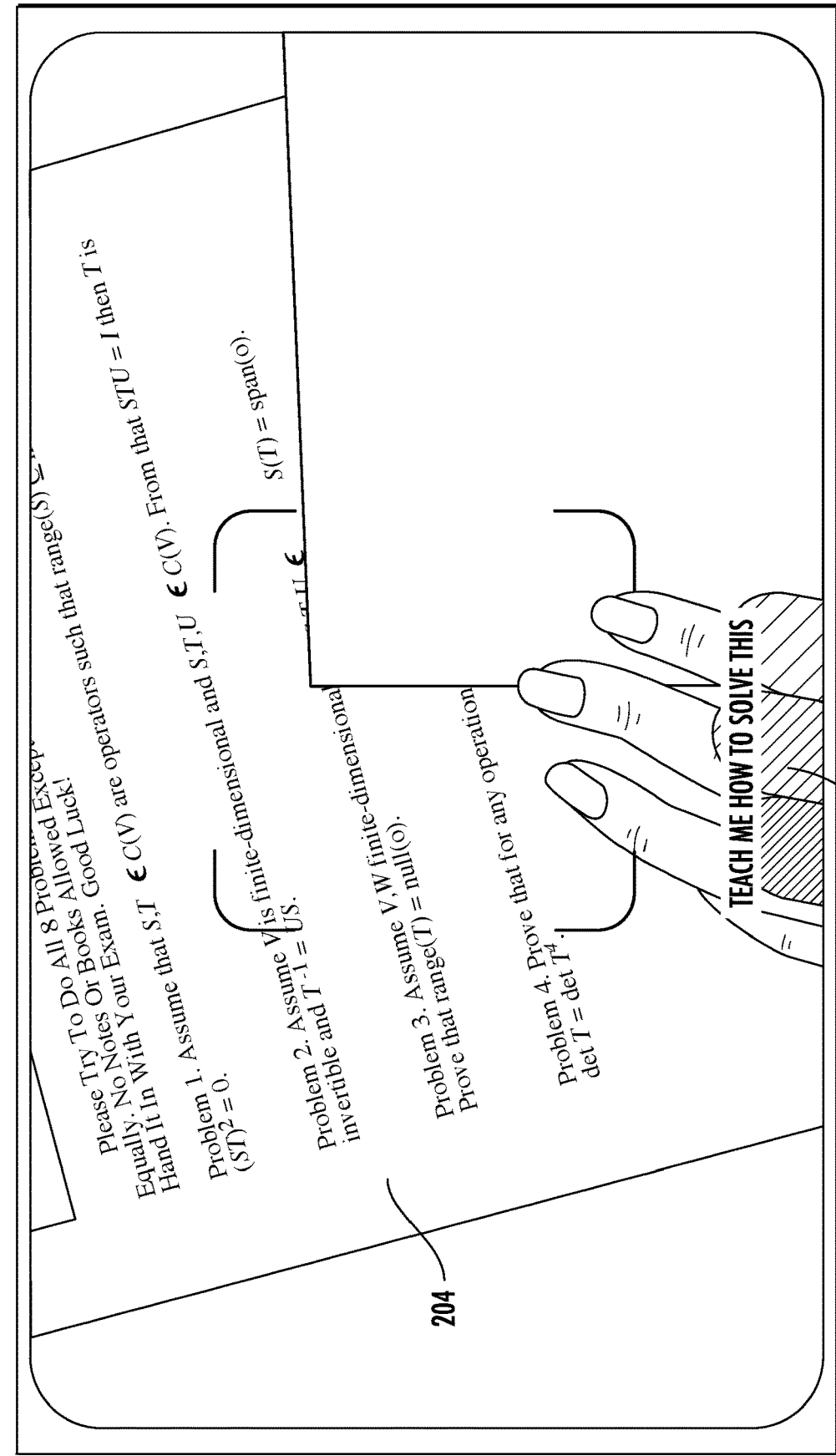

The one or more images 202 can be processed to determine a prompt 204 in the focal point of an environment (e.g., as depicted in FIG. 2A). The focal point may be determined based on a position in the environment, based on a user's direction, based on a detected object, based on a user's gaze, and/or based on one or more machine-learned parameters. The prompt 204 may be highlighted, underlined, and/or indicated via one or more other techniques.

The audio input may be processed to determine the spoken utterance. The spoken utterance may be provided for display via a closed caption user interface element 206. The augmented-reality experience may provide a user interface element to indicate data is being obtained via an image sensor and/or an audio sensor.

The prompt 204 can be processed to determine a multi-part response for the particular prompt 204. The multi-part response may be determined based on one or more machine-learned parameters, based on knowledge graphs, and/or based on data obtained from a database. A plurality of user interface elements can be generated based on a set of actions associated with the multi-part response.

Figure 2B:
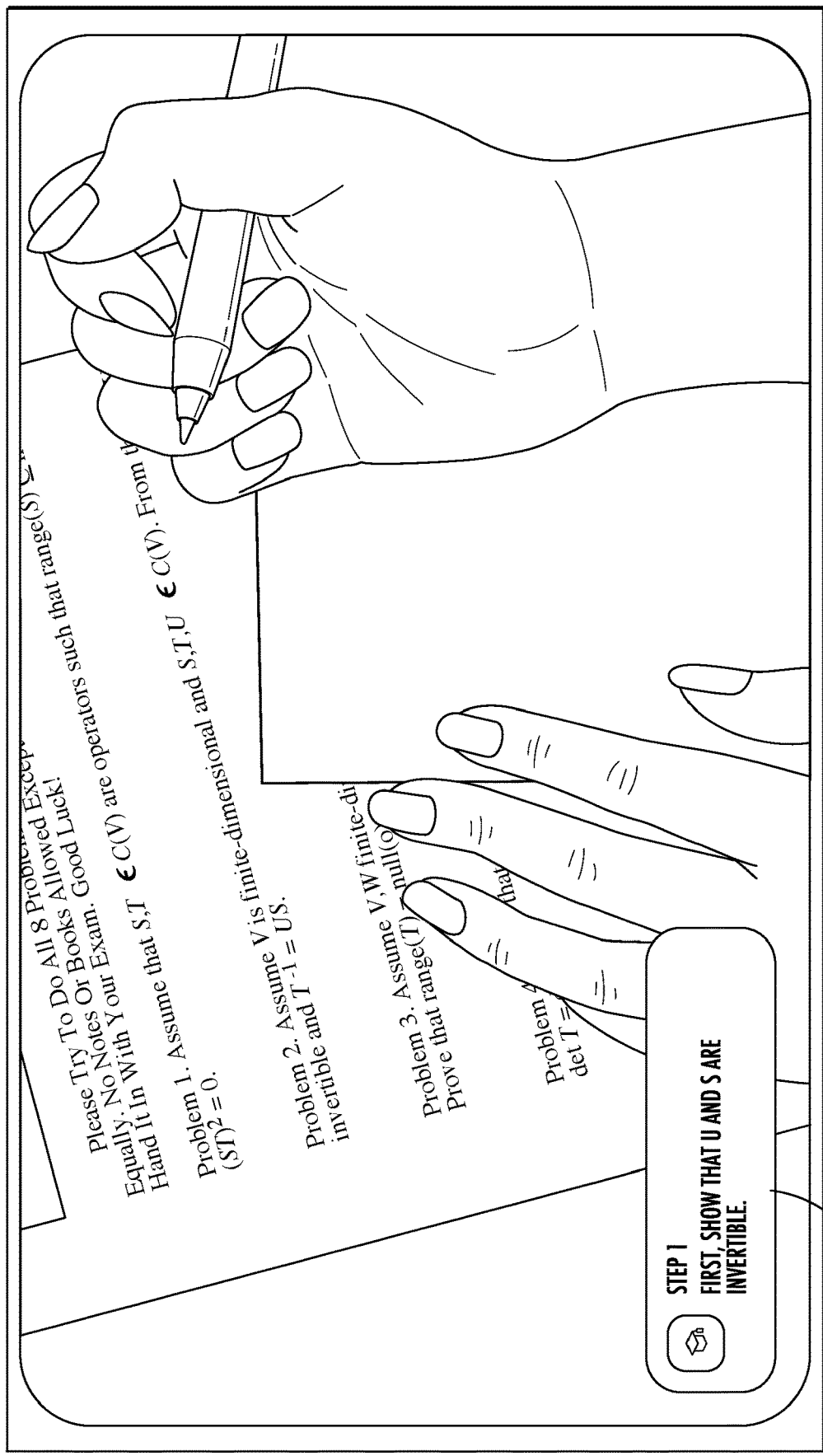

In FIG. 2B, the prompt 204 remains highlighted and a first user interface element 208 is provided for display. The first user interface element 208 can be descriptive of instructions for completing one or more actions for a first part of the multi-part response.

Figure 2C:
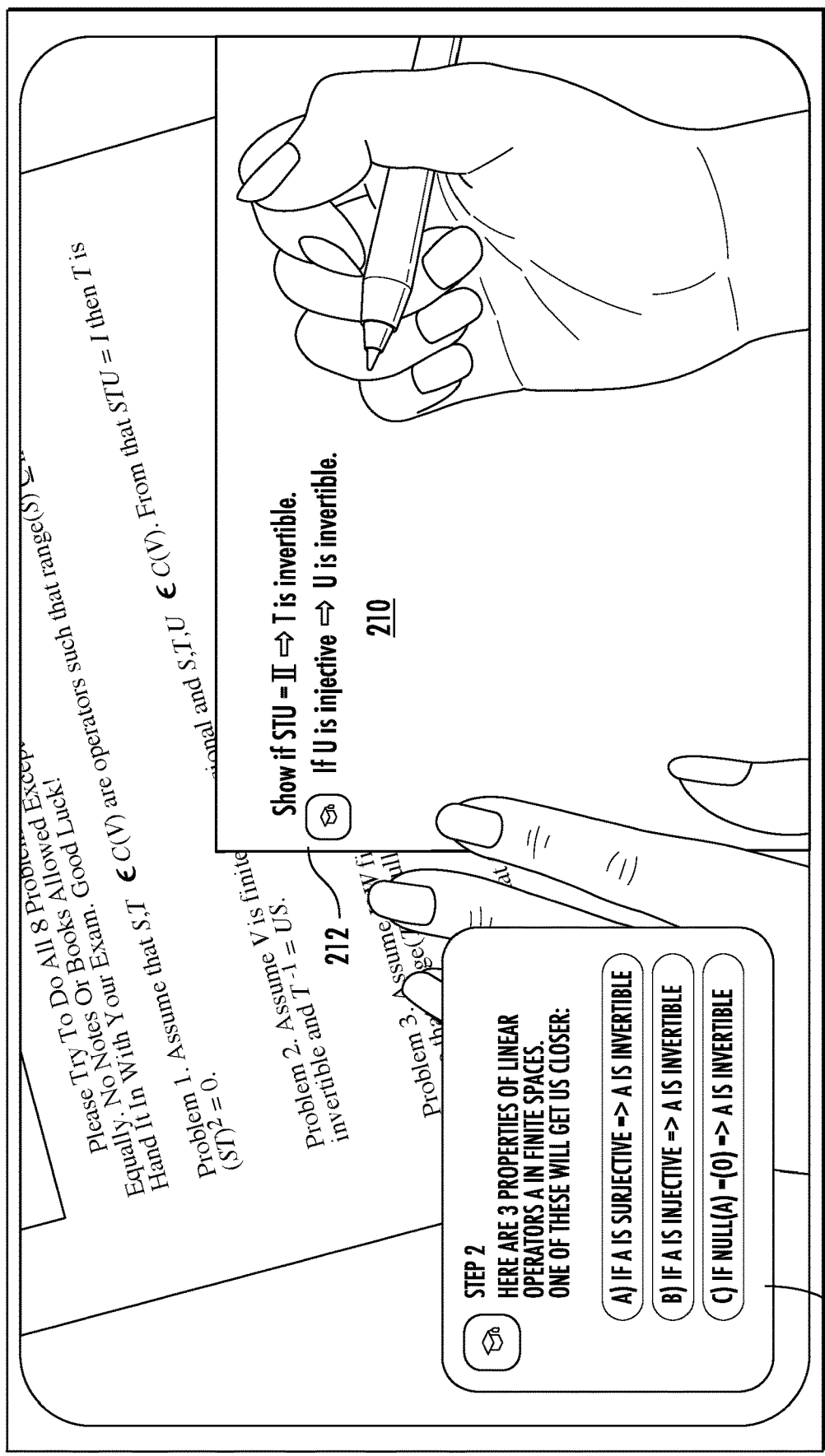

Additional image data can then be received. The additional image data can be processed to identify new text data. The new text data can include handwritten text 210. The new text data can be processed to determine a first part of the multi-part response has been completed. In response to the determination, a second user interface element 214 can be provided for display (e.g., as depicted in FIG. 2C). The second user interface element 214 can be descriptive of instructions for completing one or more actions for a second part of the multi-part response. In some implementations, the augmented-reality experience may provide a position-of-interest indicator 212, which may indicate a position-of-interest for a set of actions and/or may indicate a prompt type associated with the prompt 204.

Figure 2D:
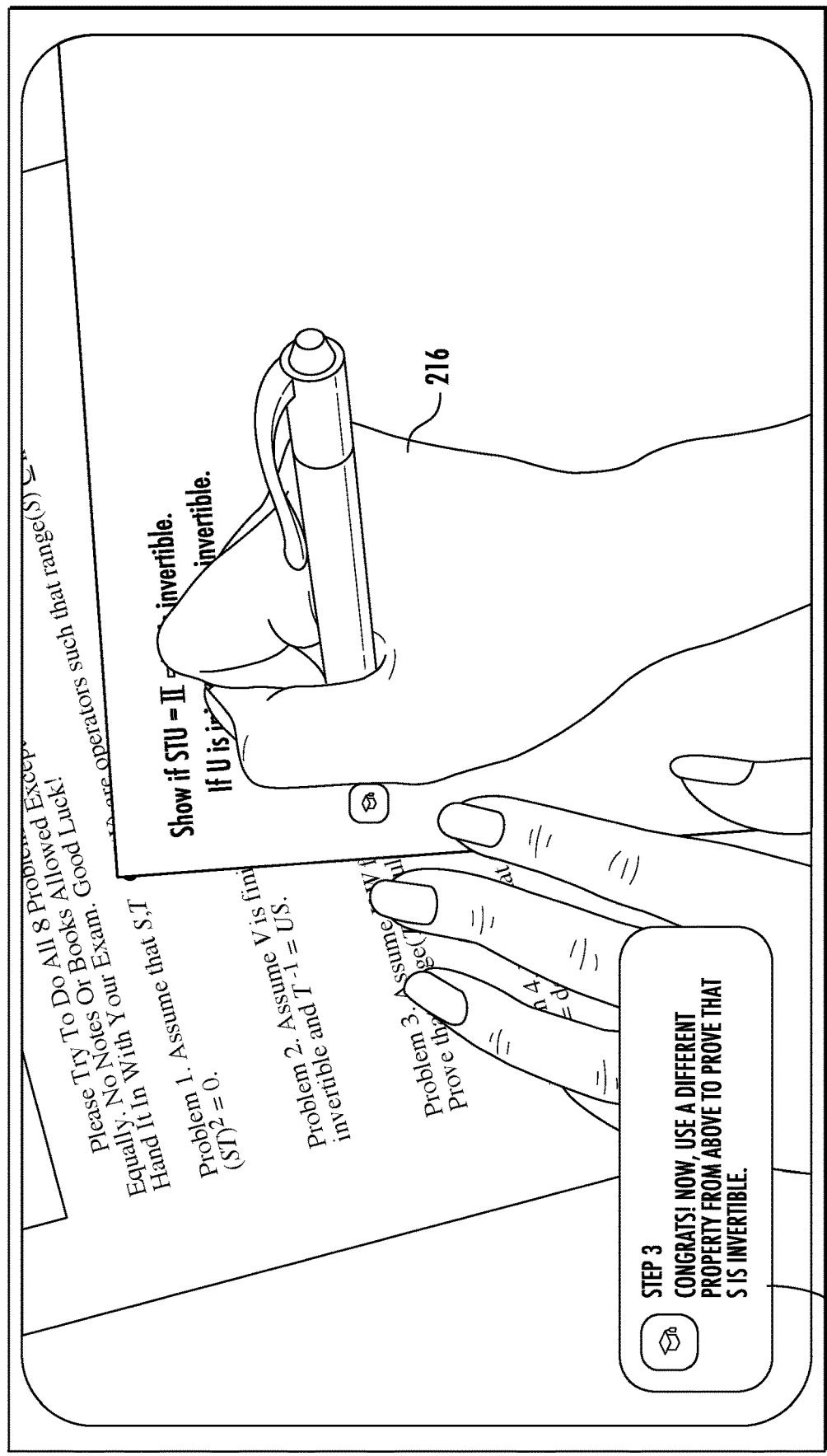

In FIG. 2D, further handwritten text 216 has been and is being provided. The systems and methods may have determined the second part of the multi-part response has been detected, and a third user interface element 218 can be provided for display. The third user interface element 218 can be descriptive of instructions for completing one or more actions for a third part of the multi-part response.

In FIG. 2E, the multi-part response has been performed with the final handwritten response 220 being identified. The augmented-reality experience may provide a completion indicator 222 and/or one or more final user interface elements 224 indicating the set of actions has been completed.

The systems and methods can then be repeated for the next identified prompt. The augmented-reality experience may include additional user interface elements for providing intuitive instructions. The augmented-reality experience may be provided with one or more audio outputs.

Figure 4:
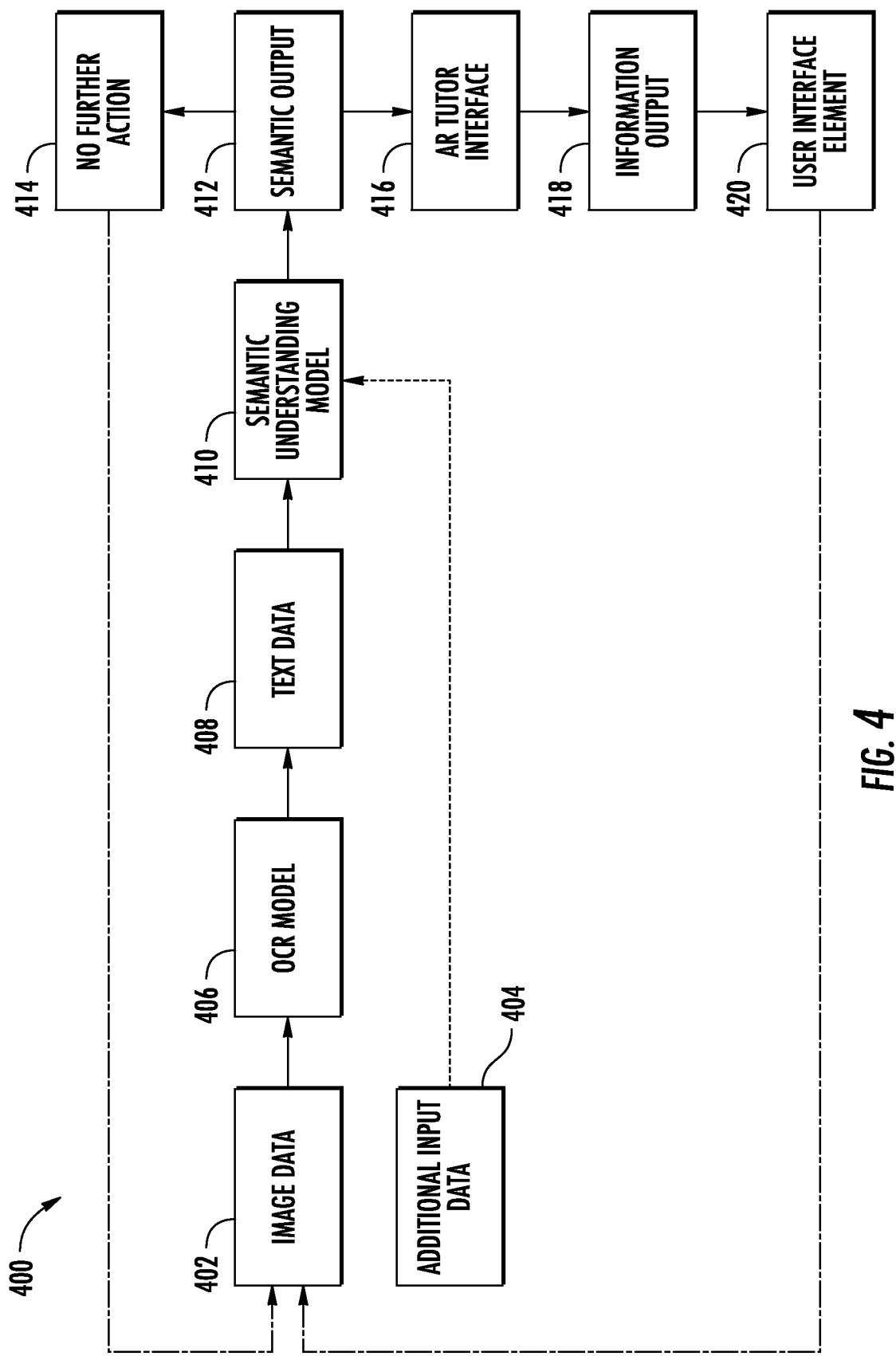
FIG. 4 depicts a block diagram of an example augmented-reality tutoring system according to example embodiments of the present disclosure.

FIG. 4 depicts a block diagram of an example augmented-reality tutoring system 400 according to example embodiments of the present disclosure. In some implementations, the augmented-reality tutoring system 400 can receive image data 402 and/or additional input data 404 descriptive of an environment and/or a particular prompt and, as a result of receipt of the image data 402 and the additional input data 404, provide a user interface element 420 that is descriptive of one or more classifications and/or instructions for completing a task. Thus, in some implementations, the augmented-reality tutoring system 400 can include an optical character recognition model 406 that is operable to recognize text in an image and a semantic understanding model 410 that is operable to generate a semantic output 412.

For example, image data 402 can be obtained via one or more image sensors. The image data 402 can be descriptive of one or more images depicting an environment. The environment may include a plurality of characters descriptive of one or more prompts (e.g., one or more questions and/or one or more instructions).

The image data 402 can be processed with an optical character recognition model 406 to recognize one or more characters, one or more symbols, and/or one or more diagrams to generate text data 408. The text data 408 can include words, numbers, equations, diagrams, text structure, text layout, syntax, and/or symbols. The optical character recognition model 406 can be trained for printed text and/or may be specifically trained for determining handwritten characters.

In some implementations, additional input data 404 can be obtained. The additional input data 404 can be obtained via one or more additional sensors, which can include audio sensors and/or touch sensors. The additional input data 404 may be generated based on a spoken utterance and/or one or more selections made in user interface.

The image data 402 and/or the additional input data 404 can be processed by a semantic understanding model 410 to generate a semantic output 412. The semantic understanding model 410 can include one or more segmentation models, one or more augmentation models, one or more natural language processing models, one or more quantitative reasoning models, and/or one or more classification models. The semantic understanding model 410 can include one or more transformer models, one or more convolutional neural networks, one or more genetic algorithm neural networks, one or more discriminator models, and/or recurrent neural networks. The semantic understanding model 410 can be trained on a large language training dataset, a quantitative reasoning training dataset, a textbook dataset, a flashcards training dataset, and/or a proofs dataset. The semantic understanding model 410 can be trained to determine a semantic intent of input data and perform one or more tasks based on the semantic intent. For example, the semantic understanding model 410 can be trained for a plurality of tasks, which can include input summarization, a response task, a completion task, a diagnosis task, a problem solving task, and error detection task, a classification task, and/or an augmentation task.

Based on the semantic output 412, no further action 414 may be determined, which can lead to the process beginning again. Alternatively and/or additionally, an augmented-reality tutor interface 416 may be initiated based on the semantic output 412. For example, an augmented-reality tutor interface 416 may be initiated based on the semantic output 412 being descriptive of an error (e.g., an inaccuracy in a response and/or an issue with a configuration in the environment). Alternatively and/or additionally, an augmented-reality tutor interface 416 may be initiated based on the semantic output 412 being descriptive of a threshold amount of time occurring without an action occurring (e.g., a threshold amount of time occurring without new handwriting). In some implementations, the augmented-reality tutor interface 416 may be initiated by a user input that triggers the acquisition of the image data 402 and/or the additional input data 404.

An information output 418 may be determined based on the semantic output 412. For example, the semantic output 412 can be descriptive of an error in the environment, and the information output can include instructions for a set of actions for correcting the error (e.g., a corrective action). The set of actions may be determined based on a machine-learned model output, based on one or more knowledge graphs, and/or based on one or more search results generated by querying a database. The instructions for the set of actions may be sequentially ordered.

One or more user interface elements 420 can be generated based on the information output 418. In some implementations, a user interface element 420 may be generated for each action of the set of actions. The user interface elements 420 can then be provided to a user. The user interface elements 420 can be provided in a sequential manner. The process can then begin again.

Figure 5:
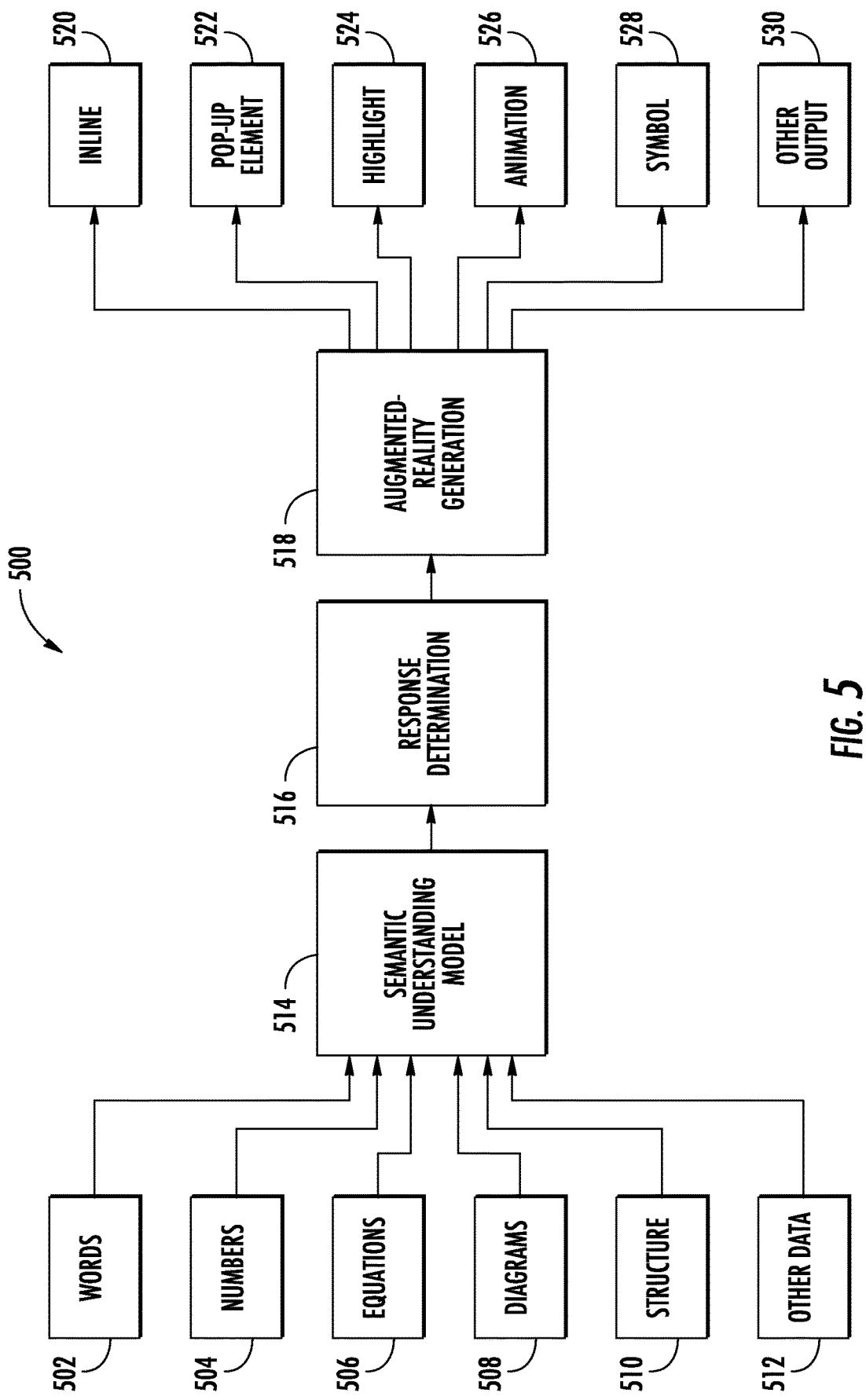
FIG. 5 depicts a block diagram of an example augmented-reality tutoring system according to example embodiments of the present disclosure.

FIG. 5 depicts a block diagram of an example augmented-reality tutoring system 500 according to example embodiments of the present disclosure. The augmented-reality tutoring system 500 is similar to augmented-reality tutoring system 400 of FIG. 4 except that augmented-reality tutoring system 500 further includes an augmented-reality generation block 518.

The augmented-reality tutoring system 500 can obtain input data, which can include words 502, numbers 504, equations 506, diagrams 508, structure data 510, and/or other data 512. The other data 512 can include time data, audio data, touch data, and/or context data. The input data can include multimodal data and/or may be conditioned, or supplemented, based on profile data and/or preference data.

The input data can be processed with a semantic understanding model 514 to generate, or determine, a prompt. The prompt can be based on a semantic understanding of the input data, which can include a semantic understanding of the environment. The prompt can include a problem to be solved (e.g., a math problem, a reading comprehension problem, and/or a science problem), a writing prompt (e.g., an analysis prompt, an essay prompt, and/or a new literary creation prompt), and/or a do-it-yourself project (e.g., building furniture, fixing an appliance, and/or maintenance on a vehicle).

The prompt can be processed with a response determination block 516 to generate a response. In some implementations, the response determination block 516 may be part of the semantic understanding model 514. The semantic understanding model 514 and/or the response determination block 516 may include one or more machine-learned models. In some implementations, the response determination block 516 can include determining a query based on the prompt and querying a database (e.g., a search engine and/or a scholarly database).

The response may include a multi-part response including a set of actions. The set of actions may be part of a larger corrective action to remedy an error. The response may be processed by an augmented-reality generation block 518 to generate a plurality of augmented-reality user interface elements to be provided to the user. The plurality of augmented-reality user interface elements can be descriptive of instructions for performing a plurality of actions associated with the response.

The plurality of augmented-reality user interface elements can include inline renderings 520 (e.g., text and/or symbols provided inline with text and/or objects in the environment), pop-up elements 522 (e.g., conversation bubbles that are rendered in the augmented-reality display), highlight elements 524 (e.g., the lightening of a plurality of pixels and/or the darkening of a plurality of pixels displaying the environment), animation elements 526 (e.g., animated imagery and/or animated text that change during the passage of a presentation period), symbols (e.g., representative indicators and/or classification symbols), and/or other user interface outputs 530 (e.g., a three-dimensional augmented rendering of an object in the scene).

Figure 9:
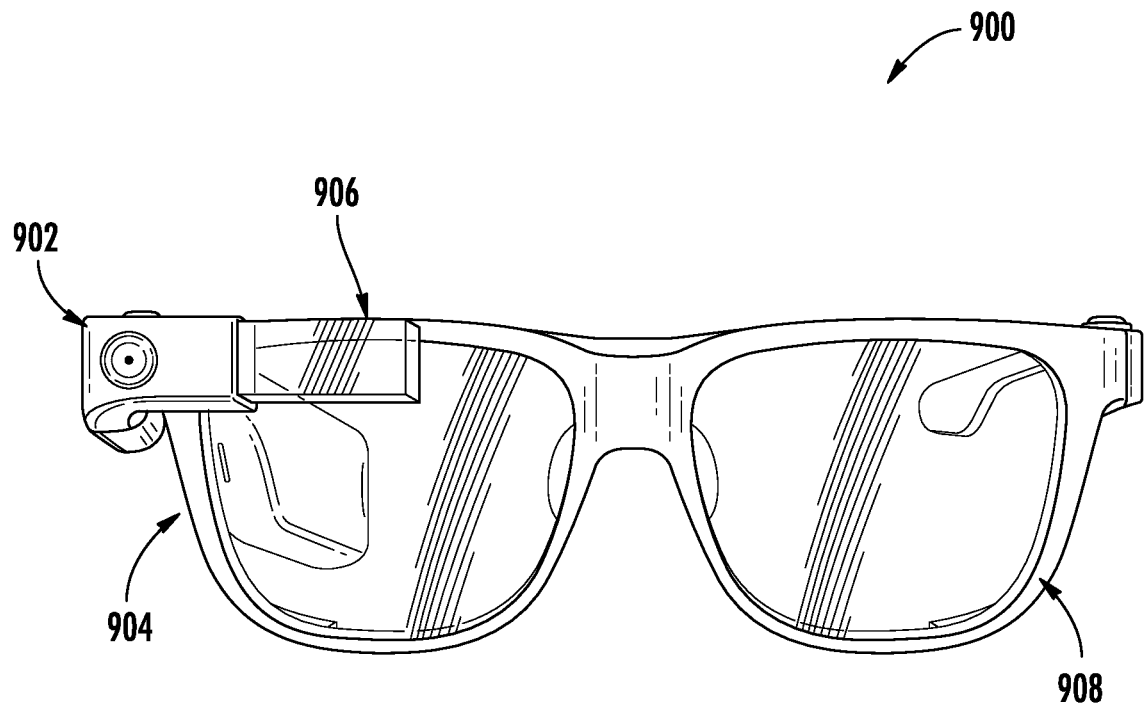
FIG. 9 depicts an illustration of an example smart wearable for obtaining image data and providing user interface elements according to example embodiments of the present disclosure.

FIG. 9 depicts an illustration of an example smart wearable 900 for obtaining image data and providing user interface elements according to example embodiments of the present disclosure. For example, the systems and methods can be implemented via a smart wearable 900. In some implementations, the smart wearable 900 can include smart glasses. The smart wearable 900 can include one or more image sensors 902, one or more computer component shells 904, one or more displays 906, and/or one or more lenses 908. The lenses may be prescription lenses, blue light lenses, tinted lenses, and/or clear non-prescription lenses. The one or more image sensors 902 can be located in which the obtained image data is descriptive of the environment in a user's field of vision. The one or more computer component shells 904 can store one or more processors, one or more communication components (e.g., a Bluetooth receiver, an ultrawideband receiver, and/or a WiFi receiver), one or more audio components (e.g., a microphone and/or a speaker), and/or one or more storage devices. The one or more displays 906 can be configured to display one or more user interface elements.

For example, the one or more image sensors 902 can generate image data, which can be processed by one or more processors in the one or more computer component shells 904. A user interface element may be selected and/or generated based on the image data. The one or more user interface elements can then be provided for display via the one or more displays 906.

Example Methods

Figure 6:
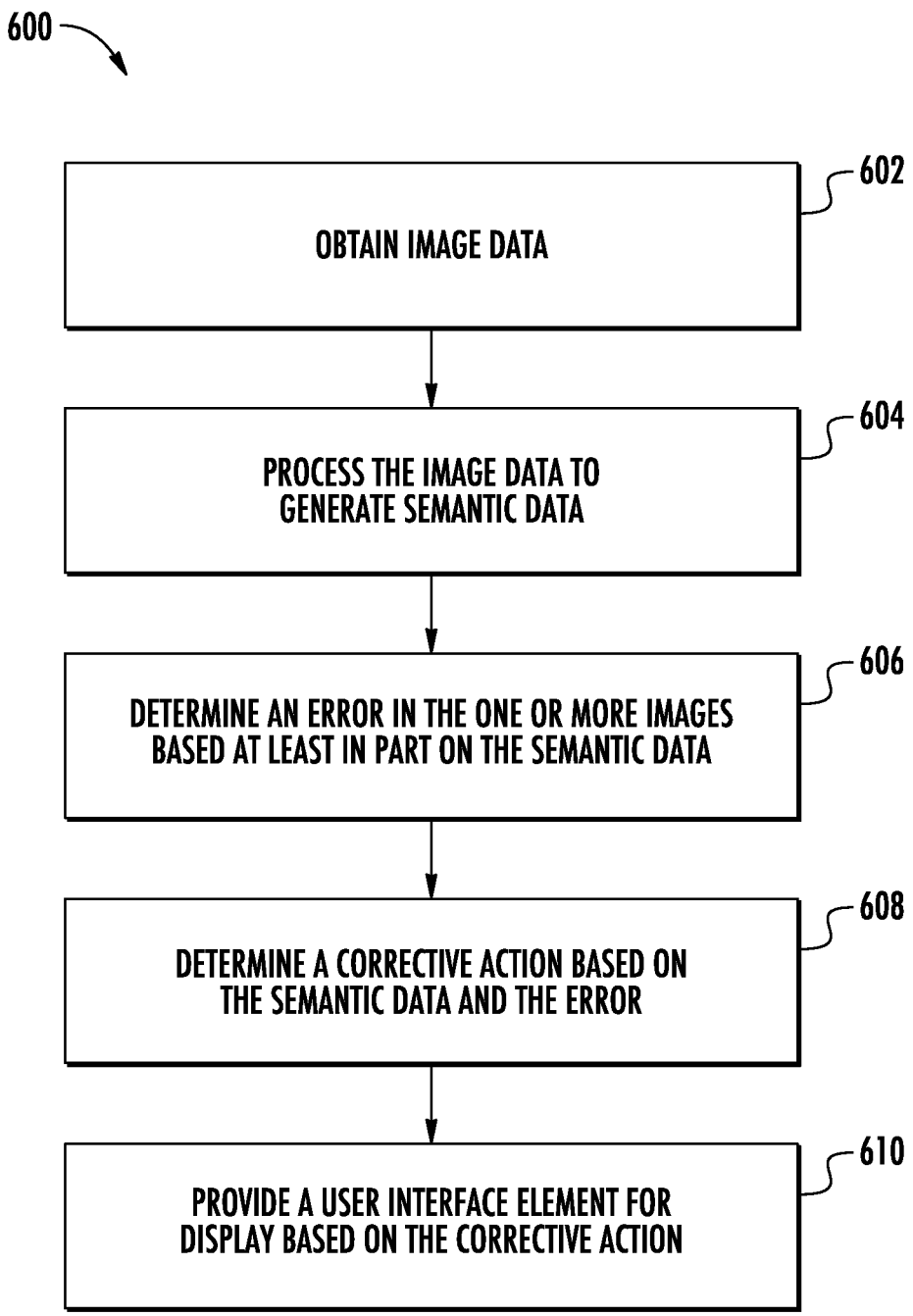
FIG. 6 depicts a flow chart diagram of an example method to perform augmented-reality tutoring according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain image data. The image data can be descriptive of one or more images. In some implementations, the one or more images can be descriptive of an environment. The environment can include one or more problems. For example, the environment can include questions for a user to answer. Alternatively and/or additionally, the environment can include objects for completing a do-it-yourself project. The image data can be generated by one or more image sensors of a mobile computing device (e.g., a smart phone). In some implementations, the mobile computing device can be a smart wearable (e.g., smart glasses).

At 604, the computing system can process the image data to generate semantic data. The semantic data can be descriptive of a semantic understanding of at least a portion of the one or more images. In some implementations, the image data can be processed with a semantic understanding model. The semantic understanding model can include one or more machine-learned models. The semantic understanding model can include a natural language processing model (e.g., one or more large language models training on a plurality of examples). In some implementations, the semantic understanding model can include a machine-learned model trained to understand equations and/or other quantitative representations (e.g., a language model trained for quantitative reasoning as discussed in Dyer et al., *Minerva: Solving Quantitative Reasoning Problems with Language Models*, GOOGLE AI BLOG (Jun. 30, 2022), https://ai.googleblog.com/2022/06/minerva-solving-quantitative-reason). Additionally and/or alternatively, the image data may be processed with an optical character recognition model to generate text data, which can then be processed with the semantic understanding model. The semantic data can be based on the contents of text, recognized objects, structure of the data, the layout of data, the structure of the information, one or more diagrams, received additional input data, context of the image capture, the type of image capture device, user profile data, and/or one or more other contexts. The semantic data can include one or more queries that summarize a problem (e.g., a question) in a focal point of the one or more images.

At 606, the computing system can determine an error in the one or more images based at least in part on the semantic data. The error can include an inconsistency with the semantic understanding. In some implementations, the error can include a deviation from a multi-part process. The multi-part process can be associated with the semantic data. For example, the multi-part process can include one or more actions for responding to a question and/or solving a problem. The error can be determined based on heuristics, based on obtained data, and/or based on an output of a machine-learned model. The error may be determined based on the handwriting text differing from the semantic intent of the printed text. For example, the semantic data can include a semantic intent of the printed text and a semantic understanding of the handwritten text. If the semantic understanding of the handwritten text is not associated with the semantic intent of the printed text, an error may be determined.

In some implementations, determining the error in the one or more images based at least in part on the semantic data can include obtaining a particular machine-learned model based on the semantic data and processing the image data with the particular machine-learned model to detect the error. For example, the semantic data may be descriptive of a particular problem type (e.g., a literary analysis problem type, a calculus problem, and/or an organic chemistry problem) and a problem-specific machine-learned model (e.g., a literary analysis model, a calculus model, and/or an organic chemistry model). Alternatively and/or additionally, a math engine (e.g., a system of mathematical functions utilized to process a problem utilizing one or more processors) may be obtained and utilized based on the semantic data.

Alternatively and/or additionally, determining the corrective action based on the semantic data and the error can include detecting a position of the error within the environment, determining an errorless dataset associated with the semantic data and the one or more images, and determining replacement data from the errorless dataset based on the position of the error within the environment.

In some implementations, the error can be determined with an error detection model. The error detection model can generate text data based on optical character recognition. The error detection model can parse the text data based on one or more features in the environment. In some implementations, the error detection model can process each parsed segment of the plurality of parsed segments to determine the error. The error detection model can be trained on a plurality of mathematical proofs. Additionally and/or alternatively, the error detection model can include an optical character recognition model and a natural language processing model.

At 608, the computing system can determine a corrective action based on the semantic data and the error. The corrective action can be descriptive of at least one of a replacement for the error or an action to fix the error. In some implementations, the corrective action can include indicating the position of the error in the environment and one or more actions for correctly responding to a prompt identified in the environment.

At 610, the computing system can provide a user interface element for display based on the corrective action. The user interface element can include informational data descriptive of the corrective action. In some implementations, the user interface element can be provided for display via the mobile computing device. The user interface element can be provided via an augmented-reality experience. The user interface element can include highlighting the prompt, in-line comments, a pop-up bubble, and/or one or more arrows.

Figure 7:
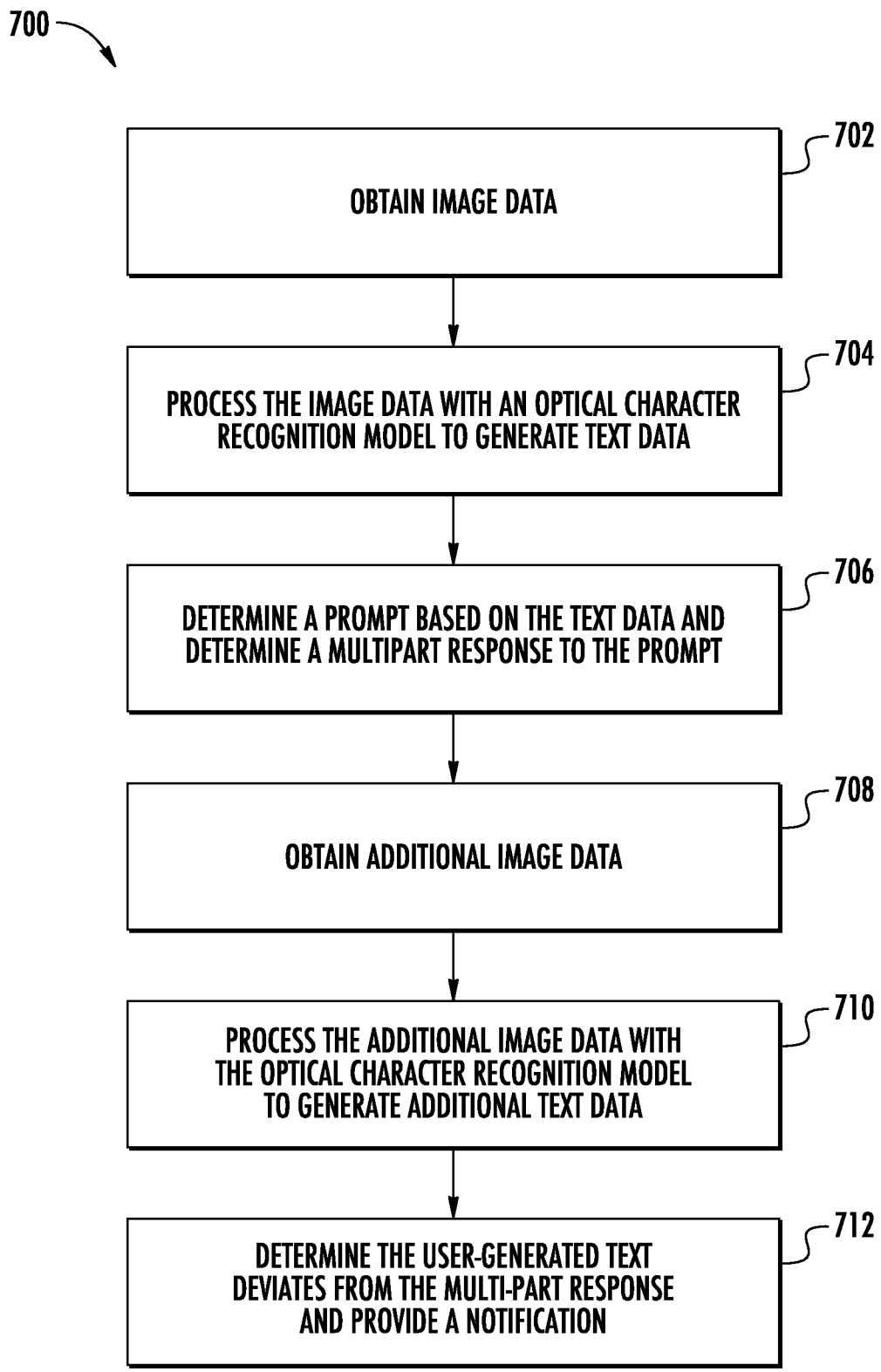
FIG. 7 depicts a flow chart diagram of an example method to perform image data processing and corrective action determination according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain image data. The one or more images can be descriptive of one or more pages. In some implementations, the one or more pages can include one or more questions. The one or more ages can include printed text and handwritten text. The one or more questions can include a mathematical equation, a writing prompt, and/or a science question including one or more diagrams.

At 704, the computing system can process the image data with an optical character recognition model to generate text data. The text data can be descriptive of text on the one or more pages. The optical character recognition model can include one or more machine-learned models. The optical character recognition model can include a model specifically trained on handwritten text. The text data can include recognized printed text and/or recognized handwritten text.

At 706, the computing system can determine a prompt based on the text data and determine a multi-part response to the prompt. The prompt can be descriptive of a request for a response. The prompt can be determined based on a semantic understanding of the text on the one or more pages.

Alternatively and/or additionally, the prompt can be a query generated based on the recognized text. The prompt may be determined based on the text including one or more keywords associated with one or more prompts and/or one or more prompt types.

The multi-part response can include a plurality of individual responses associated with the prompt. The multi-part response may be determined based on an output of a machine-learned model, based on heuristics, based on one or more search results received from a search engine, and/or one or more knowledge graphs. The multi-part response may be based on an output of a machine-learned model trained on one or more textbooks. For example, a machine-learned model may be trained to identify particular types of problems based on one or more identified features, and the same or a separate model may be trained to generate a proof illustrating how to solve the particular problem. The generated proof may be the multi-part response in which each line of the proof is a part of the response.

At 708, the computing system can obtain additional image data. The additional image data can be descriptive of one or more additional images. The one or more additional images can be descriptive of the one or more pages with user-generated text (e.g., additional handwritten text and/or user-typed data (e.g., user-generated code and/or user-generated equations)). The user-generated text can include a user response to the one or more questions.

At 710, the computing system can process the additional image data with the optical character recognition model to generate additional text data. The additional text data can be descriptive of the user-generated text on the one or more pages. The user-generated text may be descriptive of a user's attempt at answering a prompt (e.g., answering a question).

At 712, the computing system can determine the user-generated text deviates from the multi-part response and provide a notification. The deviation can be a deviation from the multipart response such that the user-generated text is counter to the multi-part response. For example, the multi-part response may include taking a first action then a second action, and the user-generated text may include taking a first action then a third action not equivalent to the second action.

In some implementations, determining the user-generated text deviates from the multi-part response can include determining the user-generated text contradicts the multi-part response. For example, user-generated text includes a semantic intent that contradicts the semantic intent of one or more parts of the multi-part response.

Alternatively and/or additionally, determining the user-generated text deviates from the multi-part response can include determining the user-generated text lacks one or more particular features of the multi-part response. For example, the multi-part response may include multiplying both sides of an equation by 2x, while the user-generated text only multiplies one side by 2x.

The systems and methods can provide a notification. The notification can be descriptive of the user-generated text having an error. The notification can be provided via an augmented-reality experience that renders one or more user interface elements to provide the notification. The notification may be descriptive of where the error occurred and how to resolve the error.

In some implementations, the systems and methods can process the image data with a machine-learned model to determine the prompt and the multi-part response. The machine-learned model may be a language model trained on quantitative reasoning. In some implementations, the machine-learned model may be specifically trained on one or more subjects using scholastic materials (e.g., textbooks and/or scholarly articles).

In some implementations, the systems and methods can process the additional image data with a machine-learned model to determine the user-generated text deviates from the multi-part response.

Figure 8:
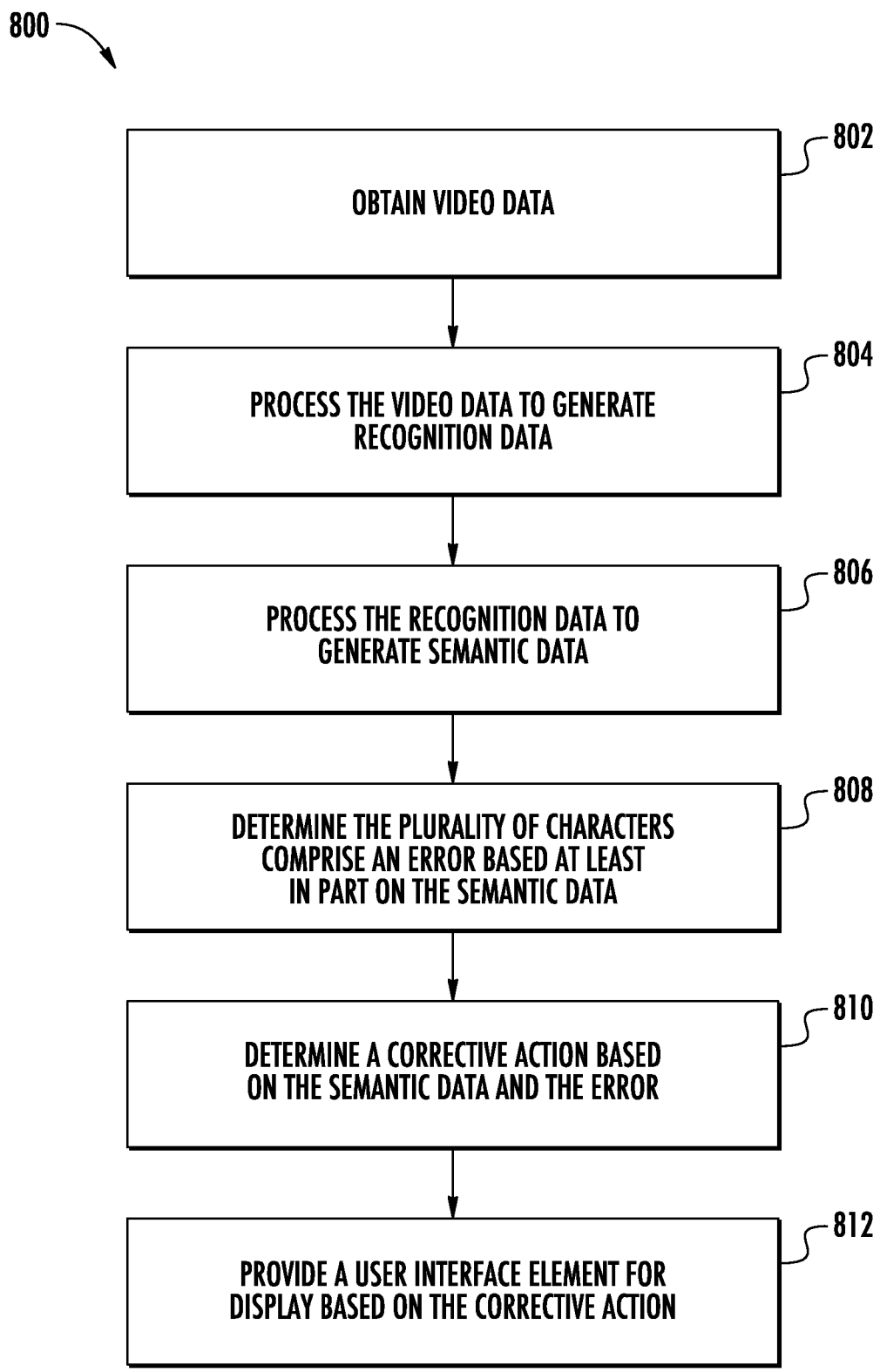
FIG. 8 depicts a flow chart diagram of an example method to perform video data processing and corrective action determination according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain video data. The image data can be descriptive of one or more images. The one or more images can be descriptive of one or more pages. In some implementations, the one or more pages can include a plurality of characters. The plurality of characters can be part of a problem (e.g., a question, a writing prompt, and/or an issue statement). The characters can include letters, numbers, and/or symbols. The one or more pages can include text, pictures, shapes, diagrams, and/or white space.

At 804, the computing system can process the video data to generate recognition data.

At 806, the computing system can process the recognition data to generate semantic data. The semantic data can be descriptive of a semantic understanding of at least a portion of the plurality of characters. In some implementations, the semantic data may be based on text, pictures, shapes, diagrams, and/or white space.

At 808, the computing system can determine the plurality of characters include an error based at least in part on the semantic data. The error can be descriptive of text that is at least one of counter to the semantic understanding or an inaccuracy. The inaccuracy can be determined by processing the plurality of characters with one or more machine-learned models.

At 810, the computing system can determine a corrective action based on the semantic data and the error. The corrective action can be descriptive of at least one of a replacement for the error or an action to fix the error. The corrective action may include a deletion action (e.g., deleting a subset of the plurality of characters) and a writing action (e.g., writing down one or more new characters).

At 812, the computing system can provide a user interface element for display based on the corrective action. The user interface element can include informational data descriptive of the corrective action. In some implementations, the user interface element can include one or more pop-up elements that are descriptive of a plurality of sub-actions for performing the corrective action. The user interface element may include an in-line overlay. The in-line overlay can be utilized to augment at least one of the one or more images or one or more additional images to generate one or more augmented images. The one or more augmented images can include the in-line overlay superimposed over at least a portion of the one or more pages. In some implementations, the in-line overlay can be descriptive of the corrective action. Additionally and/or alternatively, the user interface element can include augmenting one or more of the images to indicate a position of the error.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
   one or more processors; and
   one or more non-transitory computer-readable media that collectively store instructions that, when executed by the one or more processors, cause the computing system to perform operations, the operations comprising:
      obtaining image data, wherein the image data is descriptive of one or more images, wherein the one or more images are descriptive of an environment;
      processing the image data with a machine-learned model to generate semantic data, wherein the semantic data is descriptive of a semantic understanding of at least a portion of the one or more images, wherein the machine-learned model comprises a language model trained for multi-part quantitative reasoning, wherein the language model was trained on a plurality of mathematical proofs;
      processing the semantic data with the machine-learned model to generate a multi-part response for a detected problem in the one or more images, wherein the multi-part response is descriptive of a proof for the detected problem;
      determining an error in the one or more images based at least in part on the multi-part response;
      determining a corrective action based on the multi-part response and the error, wherein the corrective action is descriptive of at least one of a replacement for the error or an action to fix the error;
      generating one or more augmented images based on the correction action and the one or more images, wherein the one or more augmented images comprise one or more user interface elements rendered into the one or more images, wherein the one or more user interface elements comprise text superimposed over at least a portion of the one or more images, wherein the text of the one or more user interface elements comprise informational data descriptive of the corrective action;
      providing the one or more augmented images for display based on the corrective action;
      obtaining additional image data after providing the one or more augmented images for display, wherein the additional image data is descriptive of one or more additional images, wherein the one or more additional images are descriptive of the one or more pages with user-generated text;
      processing the additional image data and the multi-part response to determine a particular portion of the user-generated text deviates from the multi-part response; and
      generating one or more second augmented images that indicate the particular portion of the user-generated text that has a determined error.

2. The system of claim 1, wherein determining the error in the one or more images based at least in part on the semantic data, comprises:
   obtaining a particular machine-learned model based on the semantic data; and
   processing the image data with the particular machine-learned model to detect the error.

3. The system of claim 1, wherein the error comprises an inconsistency with the semantic understanding.

4. The system of claim 1, wherein the error comprises a deviation from a multi-part process, wherein the multi-part process is associated with the semantic data.

5. The system of claim 1, wherein determining the corrective action based on the semantic data and the error comprises:
   detecting a position of the error within the environment;
   determining an errorless dataset associated with the semantic data and the one or more images; and
   determining replacement data from the errorless dataset based on the position of the error within the environment.

6. The system of claim 1, wherein the error is determined with an error detection model, wherein the error detection model:
   generates text data based on optical character recognition;
   parses the text data based on one or more features in the environment; and
   processes each parsed segment of a plurality of parsed segments to determine the error.

7. The system of claim 6, wherein the error detection model is trained on a plurality of mathematical proofs.

8. The system of claim 6, wherein the error detection model comprises an optical character recognition model and a natural language processing model.

9. The system of claim 1, wherein the image data is generated by one or more image sensors of a mobile computing device, and wherein the one or more user interface elements are provided for display via the mobile computing device.

10. The system of claim 9, wherein the mobile computing device is a smart wearable.

11. A computer-implemented method, the method comprising:
   obtaining, by a computing system comprising one or more processors, image data with one or more image sensors of a user computing device, wherein the image data is descriptive of one or more images, wherein the one or more images are descriptive of one or more pages;
   processing, by the computing system, the image data with an optical character recognition model to generate text data, wherein the text data is descriptive of text on the one or more pages;

determining, by the computing system, a prompt based on the text data, wherein the prompt is descriptive of a request for a response;

determining, by the computing system, text data comprises a problem of a particular problem type;

in response to determining the text data comprises the problem of the particular problem type, obtaining, by the computing system, a problem-specific machine-learned model associated with the particular problem type;

processing, by the computing system, the prompt with the problem-specific machine-learned model to generate a multi-part response to the prompt, wherein the multi-part response comprises a plurality of individual responses associated with the prompt, wherein the problem-specific machine-learned model comprises a language model trained for multi-part quantitative reasoning, wherein the language model was trained on a plurality of mathematical proofs, wherein the multi-part response is descriptive of a proof for the detected problem;

obtaining, by the computing system, additional image data, wherein the additional image data is descriptive of one or more additional images, wherein the one or more additional images are descriptive of the one or more pages with user-generated text;

processing, by the computing system, the additional image data with the optical character recognition model to generate additional text data, wherein the additional text data is descriptive of the user-generated text on the one or more pages;

determining, by the computing system, the user-generated text deviates from the multi-part response; and providing, by the computing system, a notification rendered in an augmented-reality experience via the user computing device, wherein the notification is descriptive of the user-generated text having an error.

12. The method of claim 11, wherein determining, by the computing system, the user-generated text deviates from the multi-part response comprises:
determining the user-generated text contradicts the multi-part response.

13. The method of claim 11, wherein determining, by the computing system, the user-generated text deviates from the multi-part response comprises:
determining the user-generated text lacks one or more particular features of the multi-part response.

14. The method of claim 11, wherein the one or more pages comprise one or more questions, and wherein the user-generated text comprises a user response to the one or more questions.

15. The method of claim 11, further comprising:
processing, by the computing system, the image data with the machine-learned model to determine the prompt.

16. The method of claim 11, further comprising:
processing, by the computing system, the additional image data with the machine-learned model to determine the user-generated text deviates from the multi-part response.

17. One or more non-transitory computer-readable media that collectively store instructions that, when executed by one or more computing devices, cause the one or more computing devices to perform operations, the operations comprising:
obtaining image data, wherein the image data is descriptive of one or more images, wherein the one or more images are descriptive of one or more pages, wherein the one or more pages comprise a plurality of characters;

processing the image data with a machine-learned model to generate semantic data, wherein the semantic data is descriptive of a semantic understanding of at least a portion of the plurality of characters, wherein the machine-learned model comprises a language model trained for multi-part quantitative reasoning, wherein the language model was trained on a plurality of mathematical proofs;

processing the semantic data with the machine-learned model to generate a multi-part response for a detected problem in the one or more images, wherein the multi-part response is descriptive of a proof for the detected problem;

determining the plurality of characters comprise an error based at least in part on the multi-part response, wherein the error is descriptive of text that is at least one of counter to the semantic understanding or an inaccuracy;

determining a corrective action based on the multi-part response and the error, wherein the corrective action is descriptive of at least one of a replacement for the error or an action to fix the error;

generating one or more augmented images based on the correction action and the one or more images, wherein the one or more augmented images comprise one or more user interface elements rendered into the one or more images, wherein the one or more user interface elements comprise text superimposed over at least a portion of the one or more images and one or more indicators, wherein the text of the one or more user interface elements comprise informational data descriptive of the corrective action, and wherein the one or more indicators indicate a position-of-interest in the one or more images associated with the error;

providing the one or more augmented images for display based on the corrective action;

obtaining additional image data, wherein the additional image data is descriptive of one or more additional images, wherein the one or more additional images are descriptive of the one or more pages with user-generated text;

processing the additional image data and the multi-part response to determine a particular portion of the user-generated text deviates from the multi-part response; and generating one or more second augmented images that indicate the particular portion of the user-generated text that has a determined error.

18. The one or more non-transitory computer-readable media of claim 17, wherein the one or more user interface elements comprise one or more pop-up elements that are descriptive of a plurality of sub-actions for performing the corrective action.

19. The one or more non-transitory computer-readable media of claim 17, wherein the one or more user interface elements comprise an in-line overlay, wherein the in-line overlay is utilized to augment at least one of the one or more images or one or more additional images to generate one or more augmented images, wherein the one or more augmented images comprise the in-line overlay superimposed over at least a portion of the one or more pages, and wherein the in-line overlay is descriptive of the corrective action.

20. The one or more non-transitory computer-readable media of claim 17, wherein the one or more user interface elements comprise augmenting one or more of the images to indicate a position of the error.

* * * * *